(12) United States Patent
Simpson et al.

(10) Patent No.: US 7,426,549 B2
(45) Date of Patent: *Sep. 16, 2008

(54) MECHANISM FOR SHARING WEB-BASED IMAGING INFORMATION FROM A MAINFRAME COMPUTING ENVIRONMENT

(75) Inventors: Shell S. Simpson, Boise, ID (US); Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 491 days.

This patent is subject to a terminal disclaimer.

(21) Appl. No.: 10/159,199

(22) Filed: May 31, 2002

(65) Prior Publication Data
US 2003/0225726 A1    Dec. 4, 2003

(51) Int. Cl.
*G06F 15/16* (2006.01)
(52) U.S. Cl. .............. 709/220; 709/202; 709/203; 709/206; 709/237; 715/725
(58) Field of Classification Search ........ 709/200, 709/202, 203, 206, 237; 715/725, 523, 526, 715/527, 745; 705/27; 358/1.15
See application file for complete search history.

(56) References Cited

U.S. PATENT DOCUMENTS

| | | | |
|---|---|---|---|
| 5,793,966 A | 8/1998 | Amstein et al. | 709/203 |
| 5,870,552 A | 2/1999 | Dozier et al. | 709/219 |
| 5,956,487 A | 9/1999 | Venkatraman et al. | 709/218 |
| 5,987,480 A | 11/1999 | Donohue et al. | 715/501.1 |
| 6,615,234 B1 * | 9/2003 | Adamske et al. | 709/203 |
| 6,623,527 B1 * | 9/2003 | Hamzy | 715/513 |
| 6,771,290 B1 * | 8/2004 | Hoyle | 715/745 |
| 2001/0047384 A1 * | 11/2001 | Croy | 709/203 |
| 2002/0010720 A1 * | 1/2002 | Long et al. | 715/527 |
| 2002/0113989 A1 * | 8/2002 | Ferlitsch et al. | 358/1.15 |
| 2002/0116291 A1 * | 8/2002 | Grasso et al. | 705/27 |
| 2003/0115326 A1 * | 6/2003 | Verma et al. | 709/225 |
| 2003/0140095 A1 | 7/2003 | Simpson et al. | |

* cited by examiner

*Primary Examiner*—Yves Dalencourt

(57) ABSTRACT

A method of providing distributed imaging capability to a user of a client device. Document creation, manipulation, editing, and output may be provided. Document design and image data may be associated with the originating user. Generic access instructions cause associated document data to be retrieved or stored. Multiple documents and output devices may be employed to accomplish the requesting user's needs. Further, interactive graphical printing configuration and monitoring may be utilized.

42 Claims, 14 Drawing Sheets

US 7,426,549 B2

MECHANISM FOR SHARING WEB-BASED IMAGING INFORMATION FROM A MAINFRAME COMPUTING ENVIRONMENT

FIELD OF THE INVENTION

The present invention relates to a distributed environment for image processing. More specifically, the present invention relates to apparatus and methods for sharing imaging information between web-based services and devices.

BACKGROUND OF THE INVENTION

The Internet is a well-known, global network of cooperatively interconnected computer networks. The World Wide Web portion of the Internet is a collection of server computers (referred to as "web sites") on the Internet, which store hyper text transfer language "HTML" documents that can be publicly accessed by computer users having a connection to the Internet.

Most basically, the Internet comprises a network of computer networks capable of transmitting messages to one another using a common set of operating rules, called communication protocols. Networks comprise addressable devices (computers) connected or "linked" by communication channels. More specifically, the World Wide Web—comprises an amalgamation of linked-together "web pages" accessible by linked web-based users, with the web pages typically presenting information to the user in a graphical fashion.

World Wide Web ("web") is used herein to refer generally to both (i) a distributed collection of interlinked, user-viewable Hypertext documents (commonly referred to as web documents or web pages) that are accessible via the Internet, and (ii) the client and server software components that provide user access to such documents using standardized Internet protocols. Currently, the primary standard protocol for allowing applications to locate and acquire web documents is hypertext transfer protocol (HTTP), and the web pages are encoded using HTML.

However, the terms "web" and "World Wide Web" are intended to encompass future markup languages and transport protocols that may be used in place of (or in addition to) HTML and HTTP.

A user at an individual web-based device (e.g., a workstation) that wishes to access a web page on the Internet typically does so using a graphical user interface software application known as a "web browser." A variety of commercial web browsers are currently available. Well-known web browsers include Netscape's Navigator and Microsoft's Internet Explorer. Web browsers function to initiate connections via the Internet to responsive computers known as "web servers" and to receive information from the web servers that is displayed on the user's workstation. Web browsers accordingly support HTTP, the current underlying communications protocol used by the Internet. In addition, web browsers may support other protocols, such as Wireless Application Protocol (WAP) as well as protocols currently used or yet to be developed.

To connect to a desired web site having retrievable information, a user typically enters a network address designated as a Uniform Resource Locator (URL) into the web browser. The URL identifies both the location of the web site and one or more pages of information contained at that web site, the web site being supported by a particular web server. The web page that a URL refers to can be pre-existing or can be generated on demand when requested, depending on the web page in question. At each URL, text, graphics, or other information may be stored on the web server in a predefined hierarchy. The URL address may be supplied by the user in a variety of ways, to include direct keyboard entry of the address, selection of a previously stored "bookmarked" address, or "clicking" on an appropriate hyper-text link appearing on a web browser control bar or on a displayed web page.

Using the URL, the web browser sends a command in the form of a retrieval request to the web server identified in the URL address. For example, when a URL is entered into a web browser, the web browser sends an HTTP command to the designated web server directing the web server to fetch (download), and then transmit, the requested data (web page) identified by the URL. Information displayed to the user is typically organized into pages that are constructed using HTML or other, similar languages such as XML, etc. The transfer of information between the web browser and the web server is done in the context of a client/server relationship with the web browser being a client of the web server.

Most commonly, networks rely on client/server architectures to perform network operations. A mainframe computer, for instance, communicates with a series of client workstations or "dummy" terminals over a series of coextensive interconnections. The interconnections that connect the mainframe with workstations are implemented using any of a variety of technologies, including various forms of physical medium, such as copper wire ("twisted-pair"), coaxial cable and fiber optic cable, and wireless, electromagnetic transmission either at low-level, such as microwave links and cellular mobile networks, or via satellite.

Typically, "clients" are applications that run on workstations and rely on mainframe/servers to perform certain operations. For example, an e-mail client is an application that enables a workstation to send and receive e-mail via a local area network (LAN) server and an e-mail server. The term "server" is thus used herein to denote a linked computing device or group of such devices acting as a single unit to provide centralized services to one or more workstations. Clients may rely on servers for any number of functions, including interconnection with other devices, web access, resources (such as database storage of files), and, in some cases, processing power. Web servers respond to a web browser's request by transmitting a web page, or other types of web content. Web content, as used herein, is a set of executable instructions a server serves to a client and which is intended to be executed by the client so as to provide the client with certain functionality.

In order to ensure proper routing of messages between networked devices, messages are first broken up into data packets, each of which receives a destination address according to a consistent protocol, and which are reassembled upon receipt by the target computer. Commonly accepted protocols for use over the Internet are Internet Protocol (IP), which dictates routing information, and Transmission Control Protocol (TCP), according to which messages are broken up into IP packets for transmission, collection, and reassembly.

Given the advances in network technology, a demand for software and systems capable of taking full advantage of these advancements is growing. In this regard, many organizations dependent on information technology are presently attempting to manage complex network environments (e.g., distributed environments) that incorporate diverse hardware, software, applications, networks, and database systems. For example, the microprocessors of devices in a distributed environment may be totally dissimilar from each other. Also, device components of distributed environments often run entirely different operating systems and are entirely independent of each other but strive to cooperate in the sharing of data. The communications protocols used by such distributed environments thus tend to be industry standards, such as Systems Network Architecture™ ("SNA") and TCP/IP. Still, modes of cooperation between networked devices are far from optimal.

Thus, there has been an increasing demand for software and systems capable of fully integrating and optimizing use of these disparate components. Moreover, it would be desirable for these integrated systems, documents, and software to be hardware independent, support multiple users, and be based on a distributed architecture.

One particular situation where hardware independence would be desirable is printing via device drivers. A conventional, but inefficient, method of controlling and managing the flow of data to and from diverse input/output (I/O) devices in a distributed environment is through the use of device drivers. Device drivers are software programs that act as an interface between the device and programs that use the device. Generally, each device, such as a particular printer, has a set of specialized commands translatable by a driver for that device. In contrast, most programs access devices by using generic commands. The driver, therefore, accepts generic commands from a program and then translates them into specialized commands for the device.

Universal device drivers have been created in an effort to eliminate or reduce the numerous differing device drivers required by various operating systems in running various peripheral devices. Generally, universal drivers incorporate most of the code necessary for devices in a particular class of devices (such as printers or modems) to communicate with the appropriate operating system components (such as the printer or communications subsystems). Most often, universal drivers are used in combination with mini-drivers, which contain any additional instructions needed to operate a specific device.

However, universal device drivers often lack true platform independence in that the OS specific device drivers are programmed for preexisting, but not newer, peripherals. Additionally, while the device driver core is operating system independent, the OS specific device drivers are not. Thus, the OS specific device drivers often have to be replaced in order to conform to a newly installed operating system. Also, often, the operating system independent driver still must include information regarding peripheral device operation and peripheral specific data object. Thus, universal drivers do not completely solve the problems of software application and platform independence in the operation of networked peripherals.

A second area in which the resources of a distributed environment are not efficiently utilized is in the realm of web-based image retrieval, manipulation, and utilization. Presently, systems and services exist which allow web users to extract and share various imaging information over the Internet.

On-line information systems typically include one computer system (the server) that makes information available so that other computer systems (the clients) can access the information. The server manages access to the information, which can be structured as a set of independent on-line services. The server and client communicate via messages conforming to a communication protocol and sent over a communication channel such as a computer network or through a dial-up connection. Typical uses for on-line services include document viewing, electronic commerce, directory lookup, on-line classified advertisements, reference services, electronic bulletin boards, document retrieval, electronic publishing, keyword searching of documents, technical support for products, and directories of on-line services, among others. The service may make the information available free of charge, or for a fee, and may be on publicly accessible or private computer systems.

The user of an on-line service uses a program on the client system to access the information managed by the on-line service. Possible user capabilities include viewing, searching, downloading, printing, and filing the information managed by the server.

U.S. Pat. No. 5,870,552 to Dozier, et al. ("Dozier"), teaches a development platform technology for publishing hypermedia documents across wide area networks (WAN). Generally, Dozier addresses the problem of editing hypermedia documents on WAN servers for WAN publishing. Dozier notes that it is not generally possible to "open" multiple WAN documents for editing and to transfer text, images, and URL's among those documents in the seamless fashion as is presently done with typical word processors for local computer documents. Also, Dozier notes that current web authoring tools generally do not provide full WYSIWYG ("What You See Is What You Get") feedback as to HTML markups and hypermedia links. However, Dozier does not teach a method to effectuate sharing of a device/software independent image in a mainframe printing environment.

U.S. Pat. No. 5,793,966 to Amstein et al. ("Amstein") also teaches a client/server system, using a web server that allows for the creation and maintenance of an on-line service using a client system that remotely causes the server to perform operations required in the authoring process. However, Amstein does not address sharing a device/software independent image in a mainframe printing environment.

U.S. Pat. No. 5,987,480 to Donohue et al. teaches a system and method for delivering documents having dynamic content embedded over the worldwide Internet or a local internet or intranet. More specifically, customized HTTP content is provided based on the identity of the user operating the client computer so that the document is individualized to the user's interests and needs. Donahue does not teach editing, retrieval, and output of a device/software independent image in a mainframe printing environment.

Accordingly, there is a great need for a new development platform for distributed publishing that overcomes the various limitations described above. This need is especially pronounced and important in view of the rapid expansion of interest in the Internet.

Accessing web-based information in a mainframe operating system such as multiple virtual storage ("MVS") and OS400 systems requires mainframe protocol such as system network architecture to communicate with one current internet protocol, TCP/IP. IBM mainframes running either MVS or VM can run software called TCP/IP for MVS and TCP/IP for VM. These products provide access from other machines running TCP/IP to access the mainframe operating system remotely, usually over a LAN. The software enables the client in a client/server scheme to act as a 3270-series terminal to MVS or VM. File Transfer Protocol ("FTP") is provided for file transfers. Both TCP/IP software products support SMTP for electronic mail. Enabling TCP/IP protocol across a mainframe computer system may allow for Internet access for terminals connected to the mainframe. The mainframe, software, or other hardware as known in the art may assign IP addresses.

An interconnect controller, which sits between the mainframe and a network may be used to route communications for large systems. The interconnect controller handles high-speed traffic between a mainframe channel and the network to relieve mainframe processing of communications.

Likewise, printing in a mainframe environment is largely controlled by the mainframe. Print jobs are processed by the mainframe computer (acting as the print server) and may be distributed to printers via proprietary high-speed interfaces such as an IBM 370 Channel interface (commonly called "bus and tag"). Otherwise, conventional RS232C interfaces or other communication interfaces may be used. The printer may receive communications from the mainframe by way of a network interface card ("NIC") or device attached to the printer.

The interface device attaches to the printer and interprets network communications sent in network protocol, such as SNA protocol, by IBM, then transmits page description language ("PDL") commands that can be executed by the printer. For example, common PDLs include Postscript or PCL printer languages. Typically, in computer operating systems such as Windows™ or OS/2™, print drivers allow correct PDL generation for the desired printer from any program executed on the client. In addition, the interface device may provide information to the mainframe or server concerning printer characteristics or status via network protocol communications.

Alternatively, printing in a mainframe environment may also be accomplished via connection with another network, such as a Novell network that supports mainframe printing capabilities. One such network function is provided by Novell Distributed Printing Services ("NDPS"). NDPS combines conventional functions of a print queue, print server, and printer into one network object, the printer agent. A WAN connection may provide communication between the mainframe and server in the Novell network to accomplish printing. A print job that is sent to the mainframe by way of an application running on the mainframe, is redirected to a NetWare printing queue. Again, the print job is typically sent to a NIC residing in a network printer, which converts the network packets to PDL commands. Printer settings may be sent with the job and interpreted before executing the job, or default print queues with specific printer settings may be employed to fully define the printing operation. However, printing is still limited to the output devices installed and configured for network access.

Furthermore, in networked printing environments, serial communication and architecture is employed. For instance, one print queue is designated for each printer. Also, a specific print driver producing a specific PDL is necessary for printing. At least two significant limitations exist in network configurations with respect to imaging/printing: 1) printed images cannot be shared or manipulated easily; and 2) peripherals are limited to those connected to and configured for the network employed.

In addition, finished projects containing print jobs from different applications cannot be easily integrated prior to printing. Usually, each print job is generated by each application by way of the print driver and sent to a printer, or different printers. This method is inefficient and, furthermore, the disparate print jobs must be manually collated after printing. Although copy/paste functions of operating systems and applications somewhat alleviate this problem, it would be advantageous to assemble a single print job for printing from different applications by selecting files and previous print jobs to comprise the single print job.

Limitations and problems associated with print queues, print drivers, print job configuration and monitoring largely prevent mainframe users from gaining possible benefits of high functional access to peripherals and computing power of the Internet. In addition, hardware and software independence is desirable, because networks as well as the Internet may comprise diverse computer platforms and systems.

As illustrated by the prior art, it is desirable to provide mainframe printing clients with utmost functionality concerning peripherals, computing power, and imaging power available in a networked computing environment. Therefore, it would be of current interest to provide apparatus and methods for sharing imaging information between web-based services and devices in a distributed environment. More specifically, the present invention relates to apparatus and methods for sharing imaging information between web-based services and devices for users of mainframe printing environments.

BRIEF SUMMARY OF THE INVENTION

The present invention relates generally to expanding the capability of a computing device to share and output image files. As described earlier, printing options and capability are often restricted by mainframe printing systems. In contrast to the limited functionality of mainframe printing, the Internet offers the possibility of a multitude of devices and services for image sharing. However, systems for exchanging data by way of devices connected to the Internet are needed in order to exploit the resource potential available via the Internet.

The present invention relates to apparatus and methods for accessing, sharing, and outputting data in a highly distributed environment. More specifically, methods and apparatus providing a user with means to store, access, edit, manage, and output data are encompassed in the present invention.

In one embodiment of the invention, a user is able to configure design data defining an image. Configuration information as well as image information may be saved and associated with the user as target data. Association allows for generic access instructions/requests (not containing file location information) to cause storage, modification, or retrieval of at least one target data file. Further, at least a portion of the target data file may be stored in an independent file format.

A client configured with a web browser and an extension accesses web content, which provides generic access instructions for accessing at least one target data file. "Extension", as used herein, refers to software, hardware, or any combination thereof that, among other things, responds to generic access instructions by generating generic access requests. "Generic access instructions or requests," as used herein, denote executable instructions not containing file location information which are intended to cause a target file to be accessed or stored. Generic access instructions are processed by the extension to generate generic access requests, thus accessing target data. Multiple target data files may be stored, modified, and retrieved in response to generic access instructions.

In addition, upon target data retrieval, output of the target image may be accomplished by accessing an output device or a service representing the output device. Selectable options are provided in accordance with the output device(s) selected. Furthermore, graphical output configuration, print preview, and print monitoring may be provided. Multiple target file output as well as multiple output device(s) may be employed to accomplish user requirements.

In further embodiments, image configuration, storage, and output may be disseminated as separate functions. Accordingly, the separate functions may be commercialized. Further, the separately distributed imaging functions may be employed in combination to accomplish user requirements.

Other features and advantages of the present invention will become apparent to those of ordinary skill in the art through consideration of the ensuing description, the accompanying drawings, and the appended claims.

BRIEF DESCRIPTION OF THE SEVERAL VIEWS OF THE DRAWINGS

In the drawings, which illustrate what is currently considered to be modes for carrying out the invention.

DETAILED DESCRIPTION OF THE EMBODIMENTS

Figure 1:
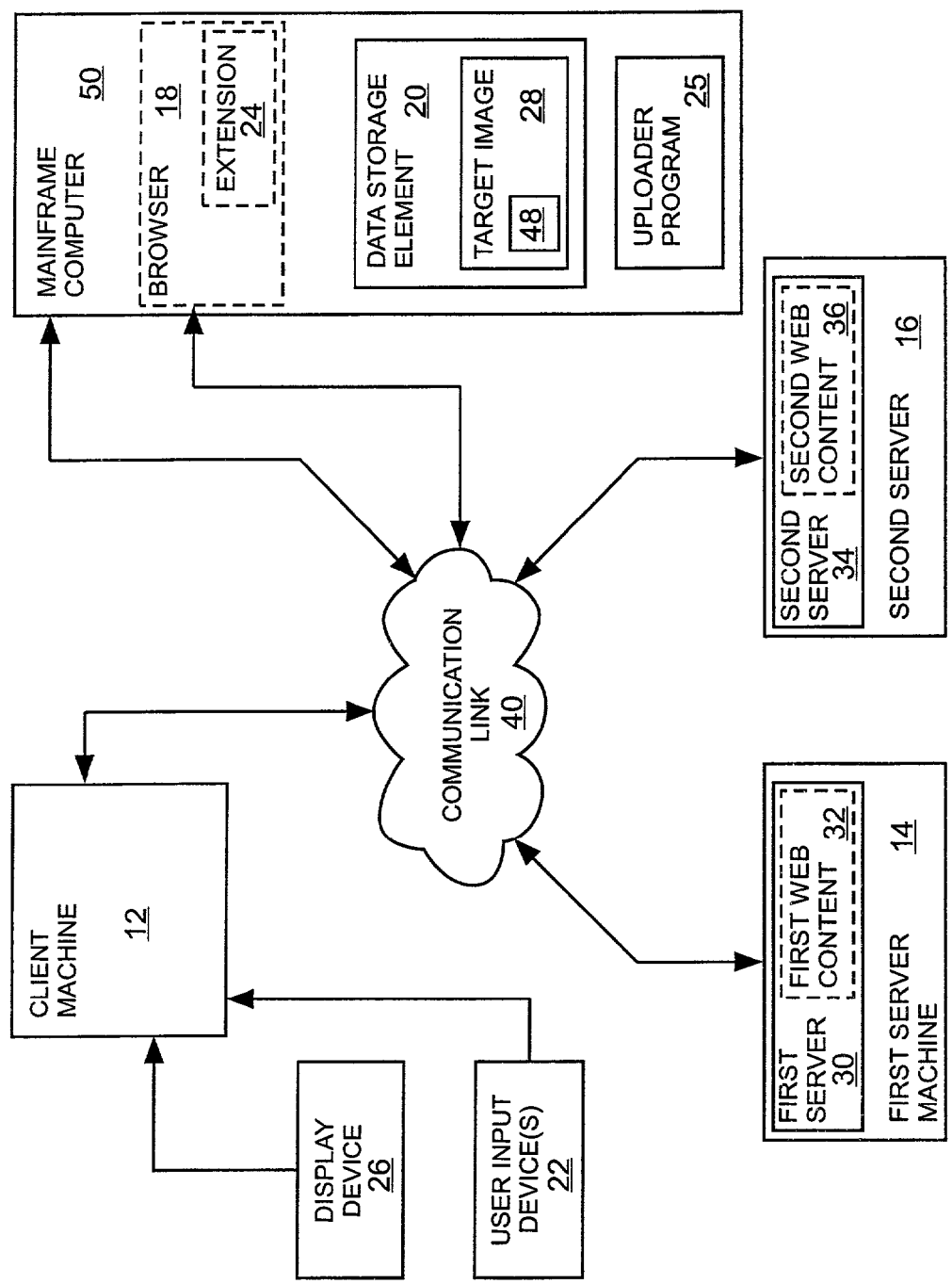
FIG. 1 is a schematic representation of a first embodiment incorporating teachings of the present invention wherein the client machine has little or no computing/memory capability.

Referring to drawing FIG. 1, shown is a client machine 12 comprised of a display device 26 and user input device(s) 22 in a mainframe printing environment. A mainframe printing environment describes a situation where a client is at least partially dependent on a mainframe to output print jobs. Client machine 12 communicates with mainframe computer 50 via conventional mainframe networking means. For instance, front-end processors (FEPs) and cluster controllers may be employed to offload communication responsibilities as part of communication link 40. This may allow the client machine 12 to establish direct connection with other network peers, depending on the network configuration. Alternatively, the client machine 12 may be directly connected to the mainframe 50 via a channel. In either connection configuration, a multitude of software and hardware allow for TCP/IP protocol to coexist within mainframe architecture. For instance, SNA incorporates TCP/IP functionality into its mainframe system.

Mainframe computer 50 comprises browser 18, which includes an extension 24 as well as data storage element 20. The extension 24 provides an interface between web content executing in the browser 18 and the data storage element 20. Depending on network configuration, the client machine 12 may comprise solely input device(s) 22 and display device(s) 26, having no computing power of its own besides the bare minimum required to connect to the mainframe 50 or a server and update the display device 26 as shown in drawing FIG. 1. Alternatively, a client machine 12 may comprise limited computing/memory power, as shown in drawing FIG. 2, where storage resides centrally, but applications are downloaded (usually small-footprint applications to minimize load time) from the mainframe 50 and executed locally. Even further, a client machine 12 may comprise a personal computer, with autonomous computing power and storage capability, as shown in drawing FIG. 3. Capability of the client machine 12 affects operation of the imaging method of the present invention because software locations and communications originate in different locations. Specifically, the location of the browser 18, extension 24, and target image determine the precise configuration and execution of the present invention.

A first server machine 14 includes a first server 30, which can respond to an appropriate request via communication link 40 from the browser 18 by supplying a first web content 32. Similarly, a second server machine 16 including a second server 34 can respond to a request via communication link 40 from the browser 18 by supplying a second web content 36. First web content 32 and second web content 36 include generic access instructions. Generic access instructions are executable instructions intended to cause the executing device to generate generic access requests in order to access and/or store target image 28. However, generic access instructions and generic access requests do not include the location of the target image 28.

In a first embodiment of the present invention, drawing FIG. 1 shows a client machine 12 with minimal computing power or memory capability in a mainframe printing environment. The client machine is dependent upon the mainframe 50 to accomplish computing and communication tasks. For instance, a user may define an image by providing input via the user input devices 22. To accomplish this functionality, the client machine 12 requests the mainframe computer 50 to execute an application (e.g., a word processing application) that accepts input from a user to define an image (e.g., a single or multiple page document) or the user may be able to operate the client machine 12 to download the image to the mainframe 50 from an external device.

A user provides input (via the user input device 22) to the client machine 12 in order to define an image. The mainframe 50 receives this input and creates a set of (user defined) design data 48 that describes the image. Next, the mainframe 50 provides the user with an option to store the design data 48 and image data as a target image 28. This option may be provided to the user via a user interface displayed by the display device 26. In response to this user input, the mainframe 50 identifies the design data 48 (user defined) and image data as the target image 28.

Also residing on the mainframe 50, is an uploader program 25. The uploader program 25 may interact with the mainframe printing systems (not shown) and/or applications that generate printing in order to capture the printing information generated by way of a mainframe application. In this way, the uploader program 25 provides an interface between mainframe application(s) and the data storage element 20. The uploader program 25 may capture printing information directly from an application, or may be configured to capture printing information via a mainframe printing system. Notably, the uploader program 25 provides a means to communicate mainframe application printing information to the data storage device 20. In this embodiment of the present invention the uploader program 25 interacts with local data storage device 20; in other embodiments the uploader program 25 may interact with a remote data storage element. Furthermore, the uploader program 25 may be configurable by the user such that it will either use a local data storage element or a remote data storage element depending on the user's preference or need. The uploader program 25 may be capable of accessing and/or converting image information acquired via applications or printing systems into a desired storage format.

Upon the mainframe 50 subsequently receiving generic access instructions, the mainframe 50 will respond to these instructions by accessing target image 28. Thus, the target image 28 is associated with the user of client machine 12, by virtue of mainframe user access characteristics. Specifically, user login or any other software or hardware means may be used to associate the target data 28 with the user. As shown, the target image 28 is stored in data storage element 20. Multiple target images 28 associated with a user may be stored in data storage element 20 of the mainframe computer 50. In this way, the identity of the user is known by the browser 18 and extension 24. Further, user identification may be used and shared by other systems. Identifying a user by way of the extension and/or client is termed "client side" technology, since the identification occurs within a client system.

Alternatively, identifying a user may also be accomplished without information provided by a client by way of a "server side" technology. In a server side technology the server must be able to determine the user's identity without information from the client. Accordingly, a different approach is needed since the browser no longer provides any sort of information regarding the user's identity. One approach is to use an "authentication website". A website accessed by a user (that wishes to access or modify information about that user) redirects to the authentication website which determines the identity of the user and then redirects back to the user with the user identity, including the location of the user's profile. In this configuration, it is assumed that websites "know" about the authentication server. Once the user's identity is determined, the website can directly interact with services in the user's personal imaging repository without the aid of the extension. Security measures may be utilized to ensure the privacy of the server side identification system and authenticity of the current user. Client side technologies, server side technologies, or combinations thereof are contemplated by the present invention.

It is further contemplated that design data 48 may be stored separately from image data comprising target image 28. Such a configuration may allow access to an editing function without modifying the image. Furthermore, design data 48 may include enough information to generate the target image 28. For instance, design data 48 may specify images contained within a graphics service, or other graphics store available on the Internet. Relative position (on the printing page) and other formatting information may be included in design data 48. Thus, design data 48 may specify target image 28 and therefore may be used to cause printing of target image 28. In addition, design data 48 may be associated with a user as described hereinabove.

Figure 9:
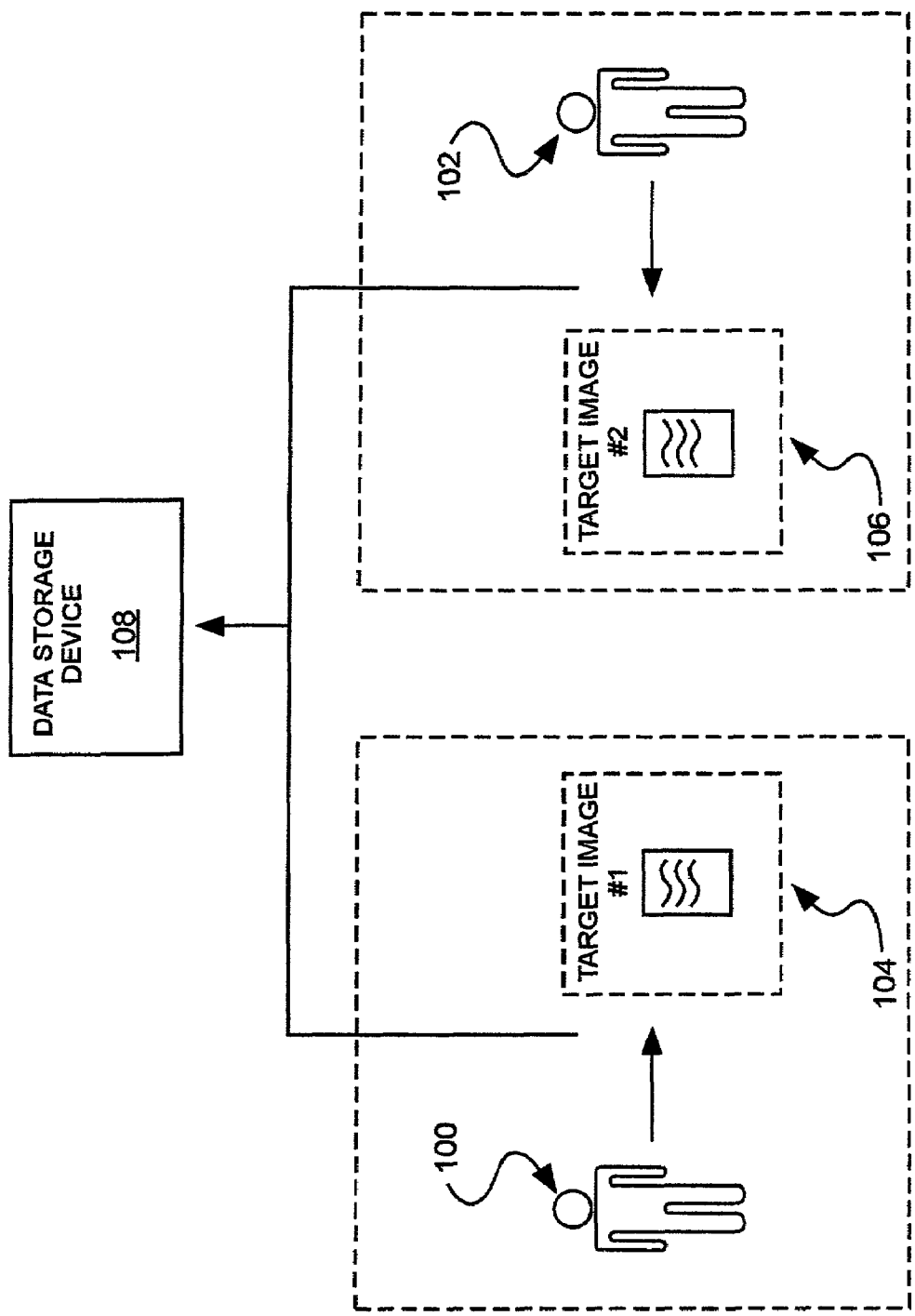
FIG. 9 is a representation of target image retrieval by two different users incorporating teachings of the present invention.

Illustrated in drawing FIG. 9 is the association of target image 104 with user 100 and the association of target image 106 with user 102. Therefore, generic access instructions for retrieval of a target image while user 100 is using a client machine cause retrieval of target image 104, whereas generic access instructions for retrieval of a target image while user 102 is using a client machine result in retrieval of target image 106. Also, target images associated with different users may be stored in data storage device 108 (both in the same or both in different) and subsequently retrieved by the associated user. Therefore, association with a user occurs upon storage of a target image, and association information may be used to determine which target image(s), if any, may be retrieved by a user.

The target image 28 may be stored in a file format that is system independent. More specifically, an independent file format represents an image in a way that is independent of the web content employed to access the image, the local computer operating system, or the hardware used to generate the image. One example of such a file format is known as "PDF." Alternatively, image data may be stored in a proprietary file format and converted (if needed) dynamically from the data storage element 20 to PDF (or other file format) on an as needed basis. The present invention is not limited to any particular image file format.

PDF is an acronym for "Portable Document Format." The format has been designed by Adobe for the exchange of documents on various platforms. Currently, the format is used under Windows, Macintosh and various UNIX platforms. This is essentially a final format—in contrast to SGML-based formats that are aimed to be revisable. "Final" means: it is not primarily aimed at being edited—although this is possible. Final form documents are formatted for visualization on a printer or a screen. In addition, PDF documents are object oriented, wherein each page is an object. Again, PDF creates a file format that represents a document in a manner independent of the hardware, OS, or software used in its creation.

In response to the user providing the browser 18 with input via the user input device 22 to retrieve the image, the browser 18 transmits an appropriate request to the first server machine 14 for the first web content 32. Upon receiving the first web content 32, the browser 18 begins executing the generic access instructions included in the first web content 32. The first web content 32 includes a set of commands that includes one or more generic access instructions and additional commands for causing the device to display the image represented by the target image 28. The execution of the generic access instructions results in appropriate generic access requests being generated that cause the target image 28 to be retrieved via data storage element 20.

Although the client machine may be a terminal type or computer type system, the client machine may also comprise a portable computing device, such as a Palm computing device, cellular phone, or other portable computing device. Such portable devices may "synchronize" with desktop computers to acquire target image associations, or may initiate associations independently. Further, the browser 18 and/or extension 24 may be tailored depending on the capability of the client machine 12 as well as the capability of the communication link 40. Additionally, a browser 18 may be enabled with multiple extensions that may be executed depending on the characteristics of the client machine 12, communication capability, or user preference.

Thus, a Palm device or similar portable computing device may effectively utilize the imaging system of the present invention. However, under certain conditions, the browser 18 and/or extension 24 may be tailored to function more effectively according to the characteristics of the computing device as well as the communication conditions. For instance, on a wireless connection to a Palm computing device with limited bandwidth and computing power, the full preview of the target image 28 may be eliminated, or substantially abbreviated. Information about web browser capabilities may be included in the web page request and the web server and/or web page generation logic may generate an appropriately formatted web page based upon this information. Conversely, a computer with exemplary computing and communication capability may include extensive preview, editing capability, as well as status information about the target image 28. Thus, web content may be tailored according to the type of client request received.

Browser 18 responds to the generic access instructions to retrieve the data by retrieving the target image 28 by way of extension 24. More specifically, the extension 24 generates an appropriate set of user specific commands to retrieve the target image 28 in response to the generic access instructions that are received. After the target image 28 is retrieved, the browser 18 causes the display device 26 to display the user-defined image.

The extension 24 is configured to respond to the execution of generic access instructions by generating corresponding specific commands that cause the target image 28 associated with a user as depicted in FIG. 9 to be accessed. It will be understood by a person skilled in the art that the extension 24 may be implemented by a programming interface (similar to an API). Thus, the generic access instructions when executed may cause calls to be issued to the extension 24 in order to accomplish data access. These calls are the generic access requests generated in response to the generic access instructions. It will also be recognized that there are many other ways (both hardware and software) to implement this same functionality. The present invention is not limited to any one way.

Next, the user causes the browser 18 to transmit an appropriate request to the second server 34 for the second web content 36 in order to print the target image 28. The second server 34 responds by transmitting the second web content 36 to the browser 18. Second web content 36 includes generic access instructions for effecting the retrieval of target image 28. In addition, the second web content 36 includes instructions to make use of the retrieved image to display a print dialog box 200, as shown in drawing FIG. 12, that includes a post-process image 202 (i.e., a print preview image) of the target image 28. It is emphasized that the display of the print dialog box 200 is accomplished by operation of the second web content 36 as opposed to the local operating system or the browser 18. Furthermore, the print dialog box 200 displays a set of selectable options 204 that are based upon the capabilities of the second server machine 16. The selectable options 204 that are selected may be graphically represented within the post-process image 202 to depict the selected options. For instance, if a user selects that the print job should be stapled from selectable options 204, a graphical depiction of a staple 216 appears in the upper right hand corner of the post-process image 202 of the target image 28, as shown in drawing FIG. 12.

After the user configures and requests printing by selecting the print button 210 of the print dialog box 200, the second web content 36 causes the client machine 12 to generate a print job. The print job describes the target image 28 and includes the appropriate commands to cause the second server machine 16 to print the target image 28. The second web content 36 further causes the client machine 12 to transmit the print job to the second server machine 16 to be printed. The second web content 36 downloaded in browser 18 is further configured to transmit appropriate requests to the second server machine 16 in order to determine the print job status. Requests and responses are transmitted on a periodic basis to effectively monitor the print job status. Status monitoring may include reloading the web page periodically, polling using a Java applet, or opening a channel to the server and detecting status events. When a response is received indicating the print job status has changed, the second web content 36 causes the client machine 12 to display this information.

Figure 4:
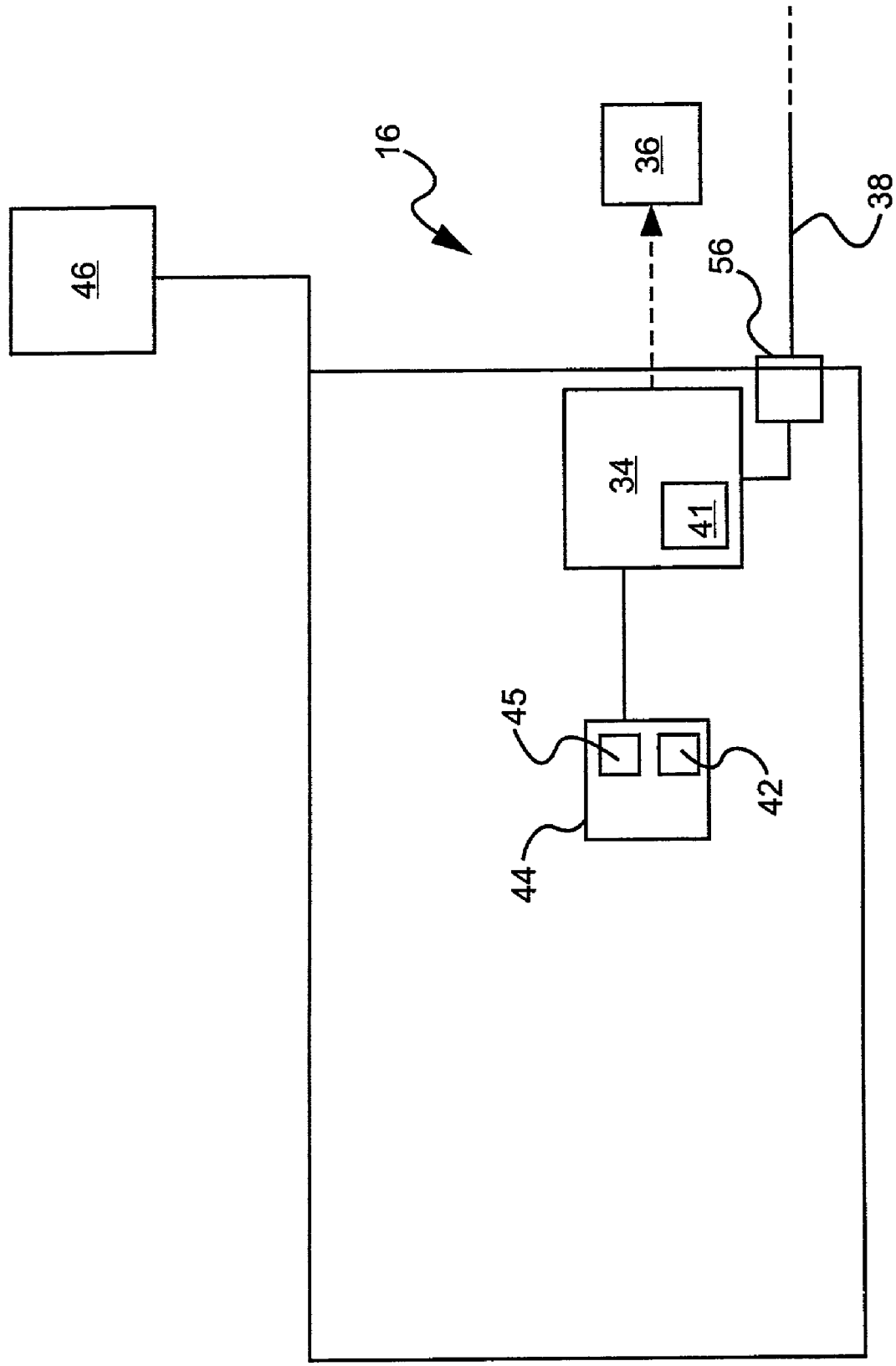
FIG. 4 is a schematic representation of a second server depicted in FIGS. 1-3 incorporating teachings of the present invention.

Referring to drawing FIG. 4, one embodiment of a second server machine 16 for carrying out the methods of the present invention is shown. Second server machine 16 is configured with both an embedded web interfacing system (e.g., a server 34) for enabling access and interaction with other devices linked to local and external communication networks, including the web, a LAN, a WAN, an intranet, the computer network of an on-line service, etc., and printer-specific hardware and software. The printer-specific hardware and software of second server machine 16 may be provided in any conventional printer configuration known in the art, including those associated with laser printers, impact printers, photographic printers, and inkjet printers. Second server machine 16 includes one or more local displays 46, which may comprise a conventional monitor, a monitor coupled with an integrated display, an integrated display (e.g., an LCD display), or other means for viewing print queues, print attributes, and associated data or processing information, including printer-specific information. Second server machine 16 also includes a network interface (I/O) 56 for bidirectional data communication through one or more of the various networks (LAN, WAN, Internet, etc.) using communication paths or links known in the art, including wireless connections, ethernet, bus line, Fibre Channel, ATM, standard serial connections, and the like.

Second server 34 provides one or more web server functions to requesting users linked by way of one or more of the various networks (LAN, WAN, Internet, etc.). The second server machine 16 of the present invention may thus be the same as or conceptually similar to the printer apparatus configured with an embedded web server described in U.S. Pat. No. 5,956,487 to Venkatraman et al., assigned to the assignee of the present invention, the disclosure of which is incorporated by reference herein in its entirety. In addition, output may include printing, audio, and video representations, or musical representations of the target image(s).

Still referring to drawing FIG. 4, the embedded second server 34 of the present invention includes a microprocessor 41 responsible for controlling all aspects of second server 34. Thus, microprocessor 41 is configured to process communication protocols and executable programs associated with second server 34 which are stored in ROM (not shown) and/or hard disk memory 44. In an embodiment of the present invention, second server 34 uses microprocessor 41 and the ROM-stored protocols to exchange data with other devices/users on one or more of the networks via HTTP, although other protocols such as FTP, Simple Mail Transfer Protocol (SMTP), Simple Network Management Protocol (SNMP), and Gopher document protocol may also be supported. Second server 34 is further configured to send and receive HTML formatted files.

Microprocessor 41 is configured to perform some or all of the printer-specific functions of second server machine 16, including control of printer-specific hardware and software. Microprocessor 41 is provided with memory 44 in the form of RAM, and/or ROM, and/or hard disk memory. As used herein, memory 44 designated for temporarily or permanently storing one or more print jobs including another data storage device in second server machine 16 is referred to herein as job retention 45. In an embodiment of the present invention, a percentage of memory 44 in second server machine 16 may be dedicated to second server 34. Alternatively, second server 34 may share the available memory 44 in second server machine 16 with job retention 45. Typically, second server machine 16 will be equipped with a minimum of 64 megabytes of RAM, although less RAM may be used in certain configurations.

Second server machine 16 may contain executable software programs stored on memory 44 related to the operation of web server 34. Memory 44 may also contain printer-specific software programs relating to the operation of printer-specific hardware. Alternatively, a separate hard disk (not shown) may optionally be provided with the requisite software programs for printing.

Using microprocessor 41, associated software, and internal circuitry of second server machine 16, second server 34 supports one or more control operations that relate to the function of second server machine 16. Second server 34 is configured to support the complete set of printing operations of second server machine 16, including access, control, and operation of printing target image 28.

In accordance with the present invention, memory 44 may contain at least one directory 42, which stores at least one interactive application configured for accessing and managing print jobs stored in job retention 45 of second server machine 16. The at least one interactive application may also, or alternatively, be stored in a directory associated with separate memory dedicated to second server 34.

In addition to being linked to a LAN or WAN, second server machine 16 may be linked directly to the Internet via network interface 56 and communication link 38 attached thereto. Embedded second server 34 within second server machine 16 is provided with at least one URL, by which it is identified over a network, and which can be accessed via HTTP, for example, from a remotely located workstation over a LAN, WAN, or the Internet. Additional URLs may be provided for components of second server machine 16 that have differing functions. At least one interactive application may be stored in memory 44 of second server machine 16. The at least one interactive application includes graphical user interface control panel options, menus, and/or links for accessing and managing print jobs found in second server machine 16.

In one embodiment of the interactive application, browser 18 downloads and displays the requested second web content 36 and requests the source file of the at least one interactive application from the second server 34 via communication link 38. Web server 34 processes the request, retrieves the at least one interactive application from memory 44, and transmits the at least one interactive application to browser 18, where it is downloaded and then executed by a platform residing on the client machine 12, or embedded within the web browser 18 software.

Java is the name of one very well-known and popular object-oriented computer programming language that is used to develop software applications. Java's popularity stems in part from its relative simplicity and the fact that Java is written in a manner that allows different computers (i.e., platforms) to execute the same Java code through the use of a "virtual machine" which is ported to each of the platform. In other words, Java programs are platform-independent. This feature has caused the use of Java to greatly increase with the growing popularity of the Internet, which allows many different types of computer platforms to communicate with each other. Small Java programs that operate within a web browser called "applets" are written to accomplish specific tasks. For example, the interactive application may be downloaded in a compiled form of Java computer programming language termed Java class files. Alternatively, several class files may be joined together to form a "jar" file that contains a collection of Java class files. At a minimum, the Java Virtual Machine platform residing on the client machine 12 or mainframe 50 (or other machine depending on the location of the browser) may comprise at least a Java-enabled browser, if needed, and a Java interpreter to run Java programs. Upon closing a session with an interactive Java application, the downloaded Java application is usually configured to be automatically removed from RAM memory of the mainframe 50 or client machine 12 in order to free up resources for other applications.

Thus, from the foregoing, it can be seen that the second web content 36 enables a device to display a print dialog box 200 that includes selectable options 204. The print dialog box 200 may be formulated via a Java applet or other content that is downloaded by or resides within browser 18. The selectable options 204 are based upon the capabilities of the second server machine 16 (or the device, such as a printer, that it represents). In addition, the second web content 36 causes a device to display a post-processing image using the target image 28. The post-process image 202 is again based upon the capabilities of the second server machine 16. Further, the second web content 36 displays the status information as the print job is processed.

Although second server machine 16 has been depicted in a printing embodiment, other embodiments are contemplated. For instance, second server machine 16 may be primarily for display, where a web server is embedded into a television, videoconference equipment, slide projector, computer monitor, or other device capable of graphically displaying the image. Further, second server machine 16 may possibly serve a primarily audio function, where the image is interpreted and then transformed into sound representations. Text may be "read" by the second server machine 16. Musical representations may be interpreted and then "played" by the second server machine 16. Alternatively, second server machine 16 may generate a holographic representation of the image data. Any combination of second server machine 16 functions described above may be employed in any fashion to create the desired output.

Figure 2:
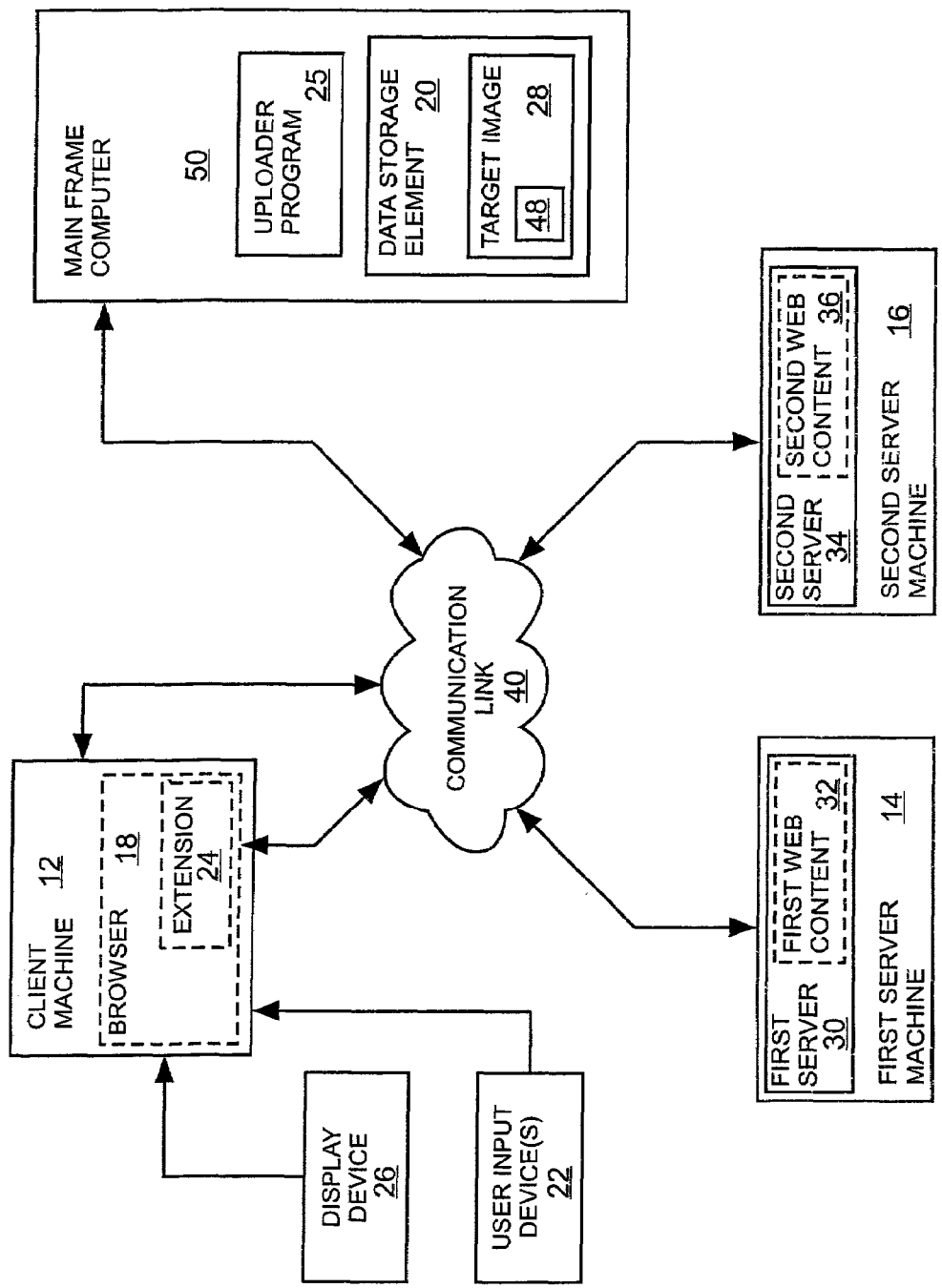
FIG. 2 is a schematic representation of a second embodiment incorporating teachings of the present invention wherein the client machine has limited computing/memory capability.

In a second embodiment of the present invention, shown in drawing FIG. 2, client machine 12 in a mainframe printing environment is configured with enough memory and computing power to download applications and execute the browser 18 and extension 24 on the client machine 12. In this embodiment of the present invention, a user provides input (via the user input device(s) 22) to the client machine 12 in order to define design data 48 that describes the user-defined image. Next, the user selects to store the design data 48 and image data as a target image 28. This option may be provided to the user via a user interface displayed by the display device 26. In response to this user input, the client machine 12 identifies the design data 48 (user defined) and image data as the target image 28 for the current user of client machine 12.

Similar to the first embodiment of the present invention, the uploader program 25 may interact with the mainframe printing systems (not shown) and/or applications (mainframe or client) that generate printing in order to provide an image to a user. In addition, the uploader program 25 provides an interface and conversion utility between application(s) and the data storage element 20 to allow for storage of the image. The uploader program 25 may capture images directly from an application, or may be configured to capture images via a mainframe printing system. The image may be stored immediately and/or automatically upon capture by the uploader 25, or, alternatively, the uploader 25 may allow the user to configure the image and store the image to the data storage element 20.

After storage of a target image 28 and upon the client machine 12 subsequently receiving generic access instructions, extension 24 will respond to these instructions by accessing target image 28. Thus, the target image 28 is the target data associated with the user of client machine 12. Therefore, generic access instructions may access a different target image 28 if a different user utilized client machine 12. User login or any other software or hardware means may be used to associate the target image 28 with the user. Multiple target images 28 may be stored in data storage element 20.

In addition, the target image may be stored in a file format that is system independent, as discussed earlier, or other file format. Next, the user provides the browser 18 with input via the user input device 22, causing the browser 18 to transmit an appropriate request to the first server machine 14 for a first web content 32. Upon receiving the first web content 32, the browser 18 begins executing the access instructions included in the first web content 32. The first web content 32 includes a set of commands also including one or more generic access instructions and additional commands for causing the device to display the image represented by the device's associated design data 48 and image data. The execution of the generic access instructions results in appropriate generic access requests being generated that cause the target image 28 to be retrieved from data storage element 20 of the mainframe computer 50.

The client machine 12 responds to the generic access instructions to retrieve the target access data by retrieving the target image 28 by way of extension 24. The extension 24 is configured to respond to the execution of generic access instructions by generating corresponding commands that cause the target image 28 associated with the client machine 12 to be accessed. Specifically, the extension 24, implemented via API or other means, generates a set of commands to retrieve the target image 28 in response to the generic access instructions. After the target image 28 is retrieved, the browser 18 causes the display device 26 to display the user-defined image.

In order to print the image, the user causes the browser 18 to transmit an appropriate request to the second server 34 for the second web content 36. The second server 34 responds by transmitting the second web content 36 to the browser 18. The second web content 36 includes generic access instructions for effecting the retrieval of target image 28.

Figure 12:
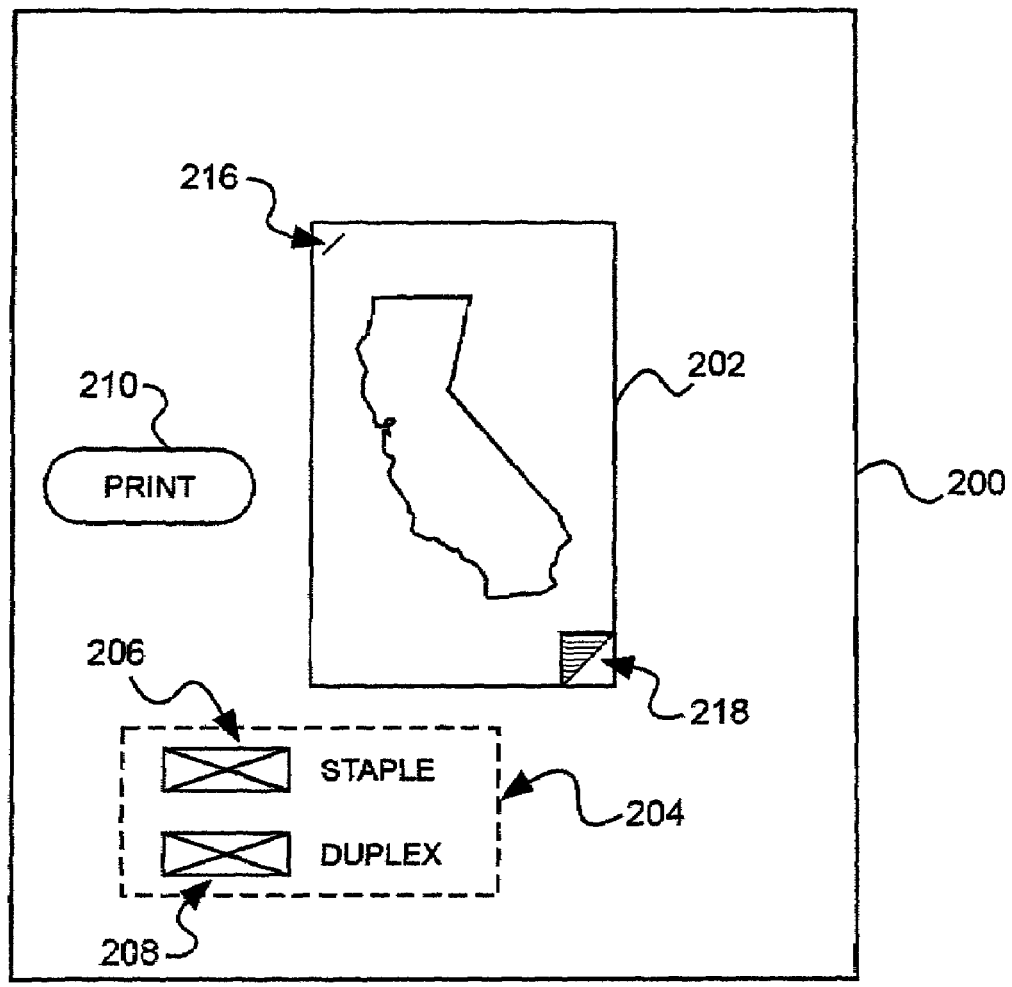
FIG. 12 is a representation of a printer dialog box incorporating teachings of the present invention.

In addition, the second web content 36 includes instructions to make use of the retrieved image to display a print dialog box 200 that includes a post-process image 202 of the target image 28. The display of the print dialog box 200 is via the second web content 36 as opposed to the local operating system or the browser 18. The print dialog box 200 configuration depends on the printing capability of the second server machine 16. Therefore, the print dialog box 200 displays selectable options 204 that are based upon the capabilities and characteristics of the second server machine 16. The status of selectable options 204 may be graphically represented within the post-process image 202 to depict the selected options. For instance, as shown in FIG. 12, if a user selects that the print job should be printed in duplex mode from selectable options 204, a graphical depiction of a folded corner 218 with printing on the second side of the page appears in the lower right-hand corner of the post-process image 202 of the target image 28. Likewise, a graphical depiction of duplex selection 208, such as a marked box, may further evidence the print configuration selected by the user.

After the user configures and requests printing via print button 210 or other means provided by print dialog box 200, the second web content 36 causes the client machine 12 to generate a print job. The print job describes the target image 28 and includes the appropriate commands to cause the second server machine 16 to print the target image 28. The second web content 36 further causes the client machine 12 to transmit the print job to the second server machine 16 to be printed. The second web content 36 is further configured to transmit appropriate requests to the second server machine 16 in order to determine the print job status. Requests and responses are transmitted on a periodic basis to effectively update the print job status. When a response is received indicating the print job status has changed, the second web content 36 causes the client machine 12 to display this information.

The second web content 36 enables a client machine to display a print dialog box 200 that includes selectable options 204. The print dialog box 200 may be invoked via a Java applet or other content that is downloaded or resides within browser 18. The selectable options 204 are based upon the capabilities of the second server machine 16 (or the device, such as a printer, that it represents). In addition, the second web content 36 causes the client machine 12 to display a post-process image 202 from the target image 28. The post-process image 202 is again based upon the capabilities of the second server machine 16. Further, second web content 36 displays updating status information as the output is processed.

Figure 3:
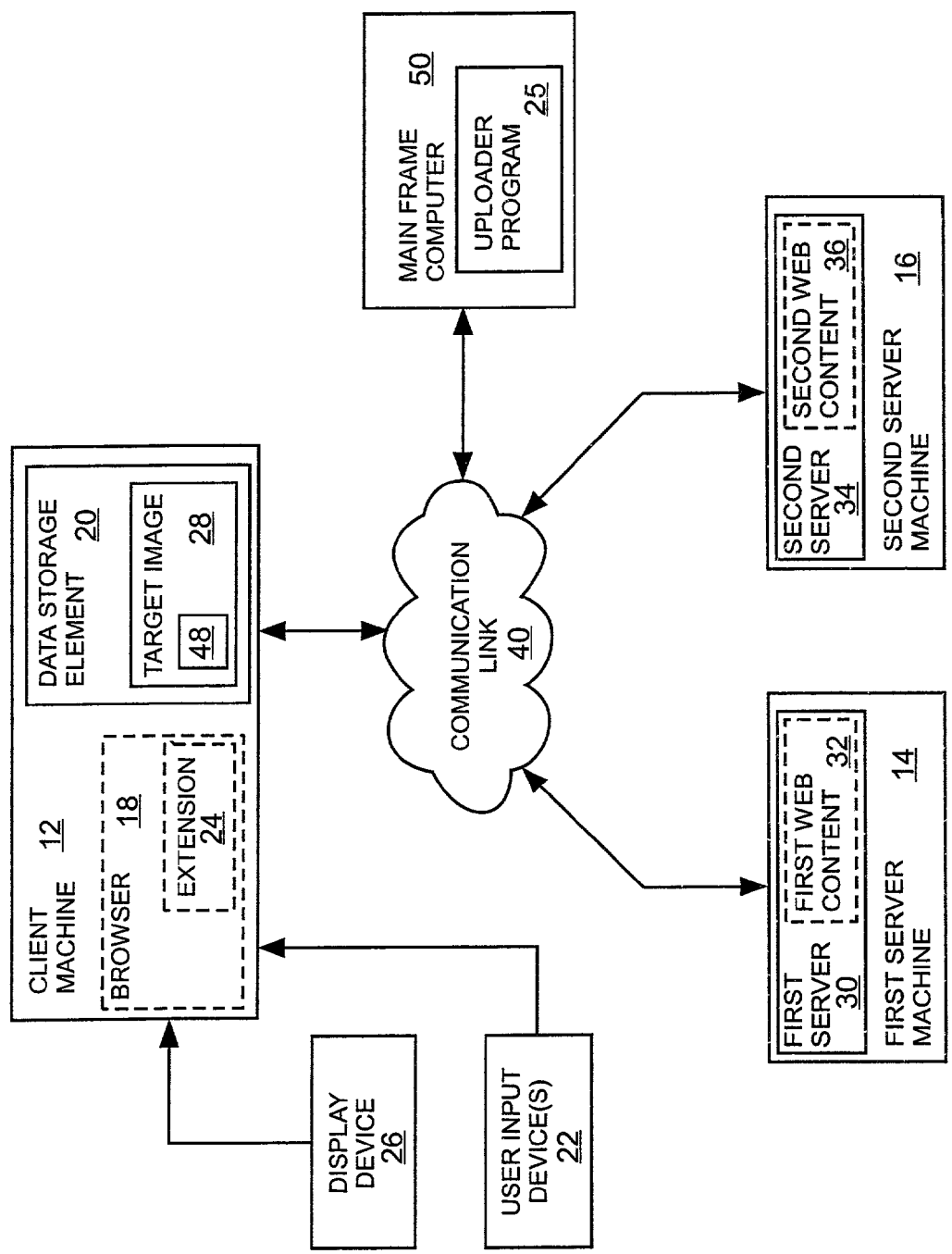
FIG. 3 is a schematic representation of a third embodiment incorporating teachings of the present invention wherein the client machine has autonomous computing/memory capability.

A third embodiment of the present invention is shown in drawing FIG. 3, wherein a personal computer configured with computing power and storage capability is connected to a mainframe printing environment. Target image 28 definition, manipulation, and output are achieved in roughly the same way as the first or second embodiments of the present invention; however, the client machine 12 contains data storage element 20, thereby including target image(s) 28. In addition, the client machine 12 communicates with the mainframe 50 by way of a terminal emulation program.

A terminal emulation program allows a PC to appear and behave as a terminal with respect to the mainframe. VT100 is one of the more popular emulation standards, based on a popular terminal produced by Digital Equipment Corporation.

Many Internet resources use the common VT100 terminal type, which uses a full-screen terminal mode. Rather than painting characters on the screen one by one or line by line, like earlier terminal emulation programs, a VT100 terminal can paint the whole screen at once. In addition, the VT100 terminal can display bold and highlighted words and permit a greater degree of formatting. Many library online catalogs use VT100 emulation on the Internet. Bulletin Board Services (BBS) more commonly use an ANSI terminal type, which is also a full-screen terminal emulation.

Another less common Internet terminal type is the IBM 3270 terminal. Many terminal emulation programs employ VT100, ANSI, and TTY emulations, but 3270 connections are less common. Web browsers often require a separate tn3270 application, in addition to any telnet client being used. The 3270 terminal is a full-screen terminal; however, the popularity of this terminal type may be rapidly decreasing.

Therefore, typically, when the client machine 12 requests printing from a terminal emulation software program, the print job is generated via the mainframe with little or no printing configuration or printing control ability. Also, the number of printing devices is limited to those configured for and installed within the mainframe printing environment.

In the present invention, the uploader program 25 interacts either with applications on the mainframe or with the mainframe's printing system to effect storage and retrieval of the print job generated within the terminal emulation software. In addition, the uploader program 25 may include the capability of associating the most current print request with the user's default target image. The uploader program 25 may also be capable of converting the image, if necessary, to a desired format for storage. Thus, printing from terminal emulation software may be accomplished via the distributed imaging system and method of the present invention.

Therefore, when generic access instructions to store the design data 48 and image data are received, the target image 28 is stored on the client machine 12 within data storage element 20. Such a configuration may reduce processing times when retrieving images in response to generic access instructions to retrieve the target image provided by second web content 36. Storage of the target image 28 may be attained via common printing file formats such as postscript or others known in the art.

In addition, as described previously, second web content 36 causes extension 24 to generate generic access requests and specific commands to effect retrieval of target image 28.

Figure 5A:
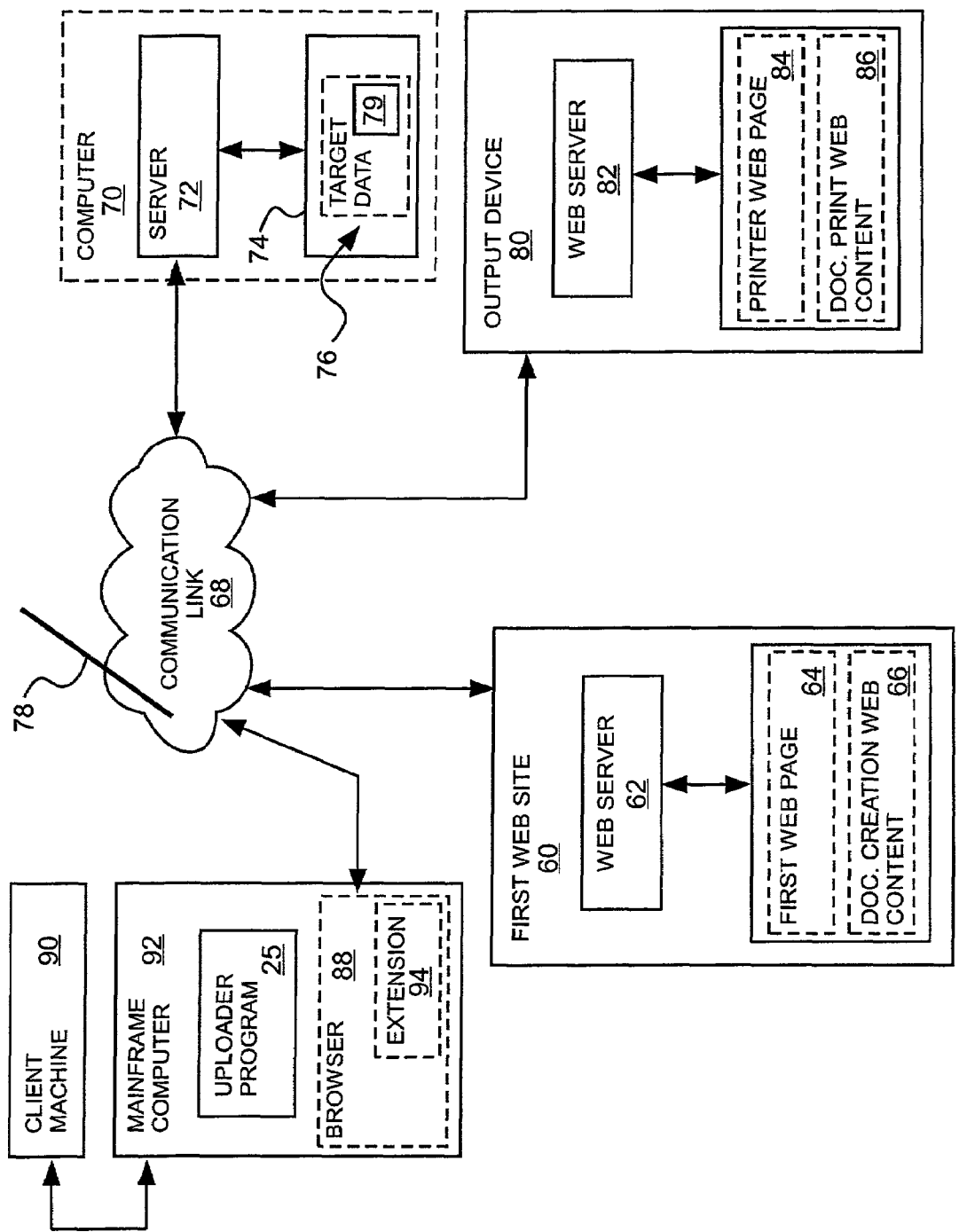
FIG. 5A is a schematic representation of a fourth embodiment incorporating teachings of the present invention.

A fourth embodiment of the present invention, as shown in drawing FIG. 5A, comprises a client machine 90 with little or no computing power in a mainframe printing environment. Mainframe 92 executes browser 88 upon request from a user of the client machine 90. Browser 88 sends communications through communication link 68 to communicate with other devices. Firewall 78 may be utilized, depending on communication configuration, and includes a conventional proxy server that allows client machine 90 to communicate with other devices. Firewall 78 may also filter out unwanted communication packets.

Figure 11:
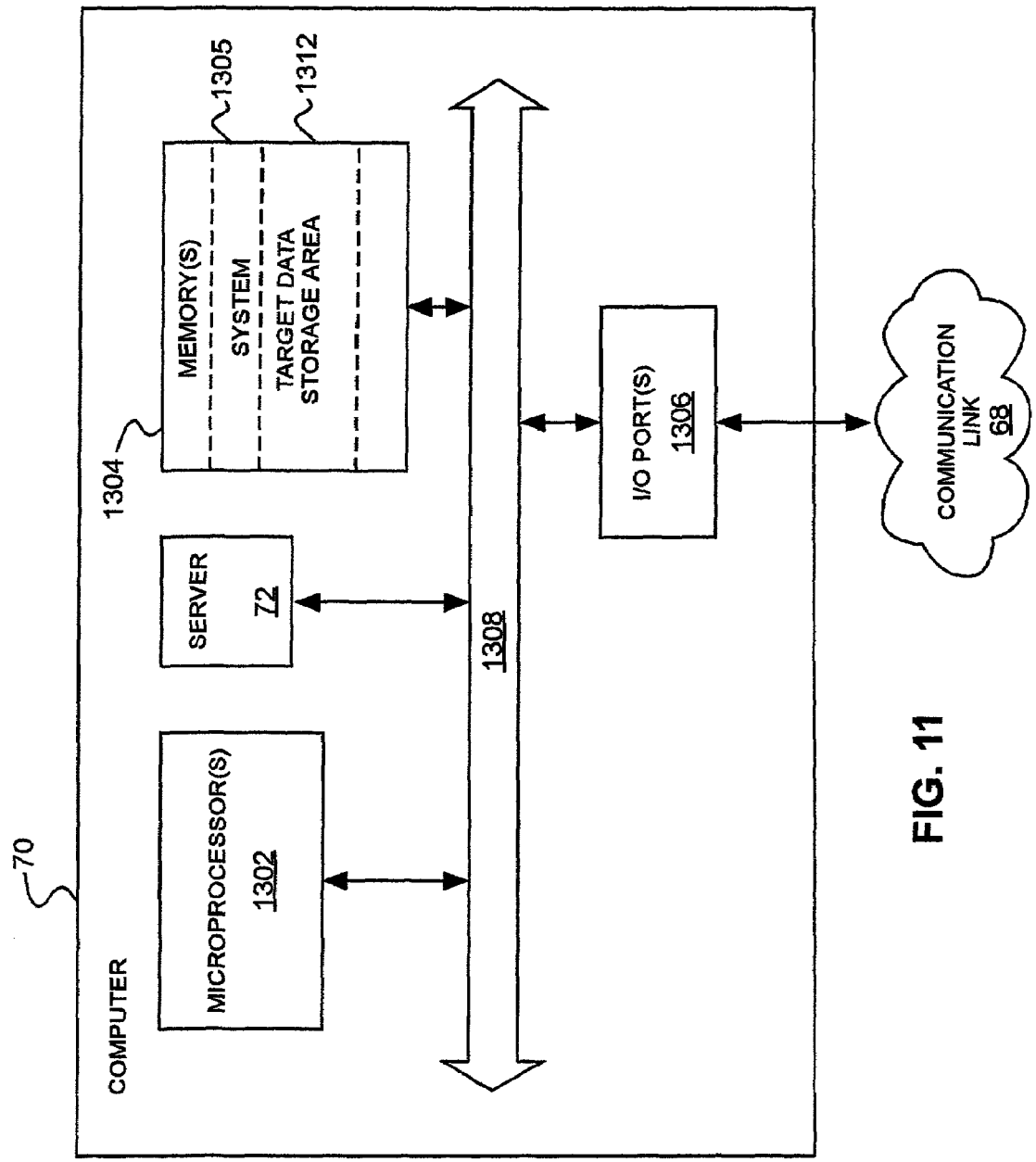
FIG. 11 is a representation of computer shown in FIGS. 5A-6B.

Computer 70, depicted in drawing FIG. 11, includes a microprocessor 1302, memory 1304, a local interface(s) 1308, and I/O port(s) 1306. Memory 1304 is further comprised of system memory 1305 and target data storage area 1312. Target data storage area 1312 may store target data 76, composed of design data 79 and image data. Local interface(s) 1308 facilitate communication between the internal circuitry and devices of computer 70 as well as communication link 68 via the I/O port(s) 1306.

Upon a user's request, browser 88 accesses a first web site 60, containing a web server 62, a first web page 64, and a document creation web content 66. First web page 64, as shown in drawing FIG. 8, contains a text portion 63 as well as a document creation hyperlink 65 to the document creation web content 66 shown in drawing FIG. 5A. Upon selection of the document creation hyperlink 65, the document creation web content 66 allows a user to configure an image. The data describing the image may be formatted in a way that is device independent, such as PDF format, as described hereinbefore.

For instance, different applications may be used to generate individual pages of device-independent output. Then, individual pages may be combined or edited to configure an image. Other images may be added or accessed via external web sites, web pages, or online services. Alternatively, files may be selected from the local storage of the client machine 90 or mainframe 92, or other storage element accessible to the client machine 90.

The document creation web content 66 also provides a means for a user to save the image data as well as the design data 79 as target data 76, which is associated with the particular user of the client machine 90. Upon user request to store target data 76, document creation web content 66 generates generic access instructions in order to cause the design data 79 generated by the user to define the image as well as the image data to be stored as target data 76. Target data 76 is associated with the user. Association may be accomplished by user login information, or other identification means.

Association of target data 76 occurs upon storage, and a user may store multiple sets of target data by way of the uploader program 25. Document creation web content 66 interacts with extension 94, which interacts with uploader program 25 to effect storage and retrieval of the print job generated within the terminal emulation software. Alternatively, the uploader functionality in uploader program 25 could be built into extension 94. Any previously stored target data that is associated with the user requesting retrieval may be accessible. Furthermore, the user may specify default target data 76. Default images may be automatically retrieved upon generic access instruction generation via web content. Alternatively, a menu or other selection means may be employed to specify desired target data 76.

Extension 94 responds to the generic access instructions generated by the document creation web content 66 and causes the target data 76 to be stored in the storage area 74 of a computer 70. Extension 94 communicates the target data 76 over communication link 68 to computer 70. Alternatively, communications may be achieved via both communication link 68 and firewall 78 to transfer target data 76 to server 72 of computer 70. If firewall 78 is employed for communication between extension 94 and computer 70, a suitable firewall friendly protocol, such as HTTP, is used to transfer target data 76 to server 72 of computer 70 and to storage area 74. It is important to note that, in other embodiments of the present invention, other communication protocols (either now existing or yet to be developed) may be used.

Depending on the communication connection configuration of first web site 60, computer 70, and output device 80, communications may be realized via communication link 68 and possibly firewall 78, if needed. Communications may be accomplished via conventional means, such as I/O ports, network interface cards, or other communication devices. Further, communication link 68 may comprise routers, repeaters, hubs, FEPs, cluster controllers, or other communication means known in the art.

Document creation as depicted in drawing FIG. 5A and described hereinabove may be commercialized as a document creation service, available to users in communication with shown devices. Information and payment means may be included in first web page 64.

Subsequent to document creation, a user may also print from the target data 76. A user of client machine 90 executes browser 88 and inputs the URL of the printer web page 84, thus requesting printer web page 84. Web server 82 of the output device 80 responds to the request by transmitting the printer web page 84 to the browser 88, which displays printer web page 84 on the client machine 90. The printer web page 84 includes a text portion 83 as well as a get document print service hyperlink 85, as shown in drawing FIG. 7. Upon the user selecting the get document print service hyperlink 85, the document print web content 86 is requested by the browser 88 and transmitted by web server 82. Document print web content 86 contains generic access instructions that cause extension 94 to generate generic access requests in order to retrieve target data 76. Generic access requests for retrieval may contain a file format for the retrieved data. The desired file format may be different from the originally stored file format of target data 76. Thus, the retrieval generic access requests communicate the desired file format to server 72 and server 72 provides the target data 76 to extension 94 in the desired format. Accordingly, generic access requests including file format specifications may be tailored depending on the capability of the client machine 90, output device 80, as well as the capability of the communication link 68.

Further, the browser 88 and/or extension 94 may be tailored depending on the capability of the client machine 90, output device 80, as well as the capability of the communication link 68. Additionally, a browser 88 may be enabled with adaptable extensions or extension functionality that corresponds to the characteristics of the client machine 90, communication capability, output device 80, or user preference. For instance, image quality may be altered to correspond with communication capabilities of the client machine 90. Alternatively, target data 76 may be converted or otherwise altered to improve an aspect of printing to output device 80.

Figure 10:
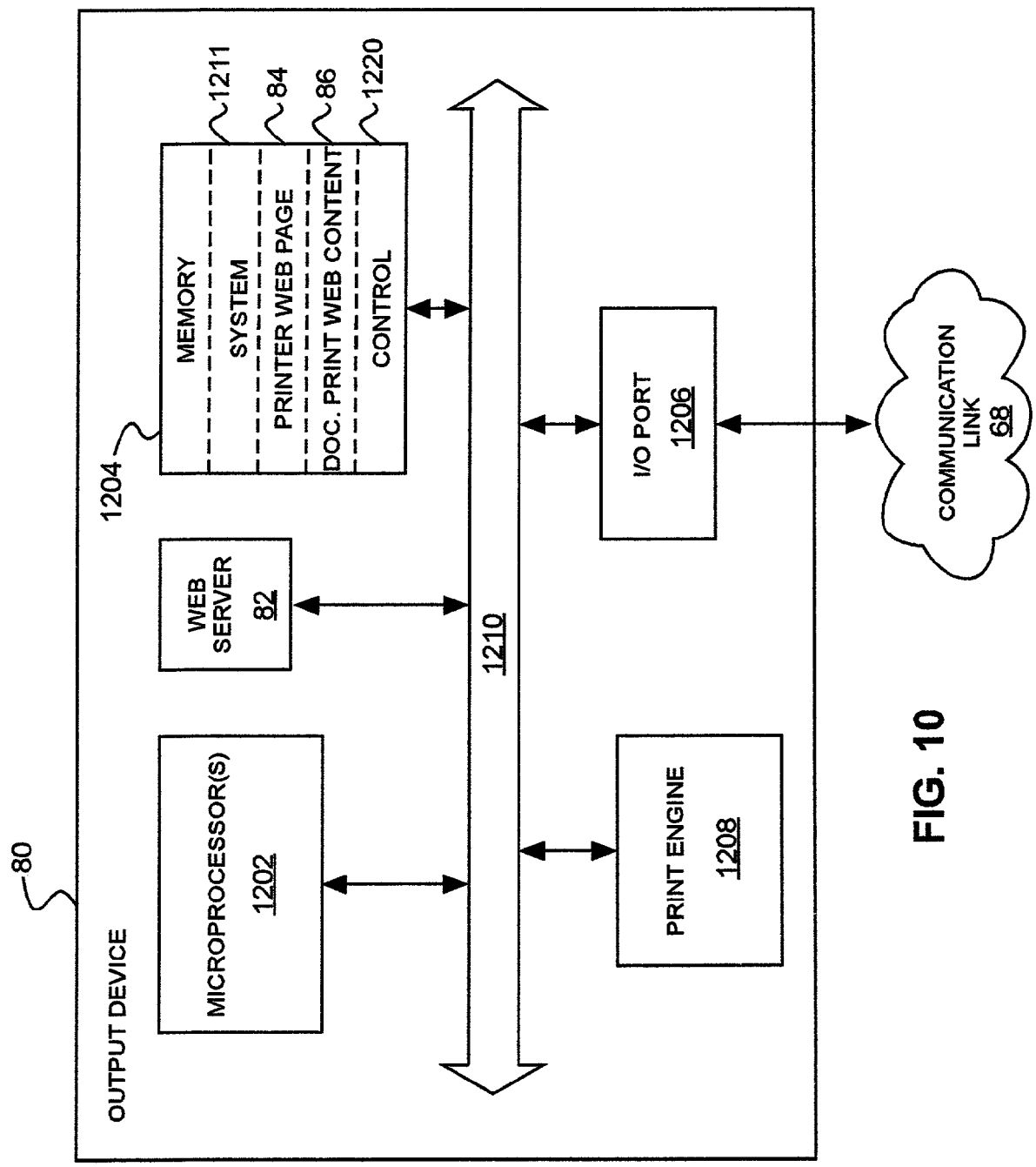
FIG. 10 is a representation of output device shown in FIGS. 5A-6B.

Referring to drawing FIG. 10, output device 80 is configured with an embedded web server 82 for enabling access and interaction with other devices linked to local and external communication networks, including the web, a LAN, a WAN, an intranet, the computer network of an on-line service, etc., and the print engine 1208. Output device 80 is also configured with a microprocessor 1202 which executes the instructions of web server 82, including processing communication protocols and executable programs associated with web server 82 which are stored in ROM (not shown) and/or memory 1204. Memory 1204 may comprise system memory 1211, printer web page 84, document print web content 86, and printer control program 1220.

The print engine 1208 of output device 80 may be provided in any conventional configuration known in the art, including those associated with laser printers, impact printers, photographic printers, and inkjet printers.

In an embodiment of output device 80, web server 82 uses microprocessor 1202 and the ROM-stored protocols to exchange data with other devices/users on one or more of the networks via HTTP and SMTP, although other protocols such as FTP, SNMP, and Gopher document protocol may also be supported. Web server 82 is further configured to send and receive HTML-formatted files.

Microprocessor 1202 is configured to perform some or all of the printer-specific functions of output device 80, including control of printer-specific hardware and software as well as print engine 1208. Microprocessor 1202 is provided with memory 1204 in the form of RAM, and/or ROM, and/or hard disk memory. As used herein, the portion of memory 1204 designated for temporarily or permanently storing one or more print jobs or other data storage device in output device 80 is referred to as job retention 1245 (not shown). In one embodiment of output device 80, a percentage of memory 1204 in output device 80 may be dedicated to web server 82.

Output device 80 may also contain executable software programs stored on memory 1204 related to the operation of web server 82. Memory 1204 may also contain printer-specific software programs relating to the operation of print engine and/or printer-specific hardware. Alternatively, a separate memory capability (not shown) may optionally be provided with the requisite software programs for printing.

Using microprocessor 1202, printer control software 1220, and internal circuitry of output device 80, web server 82 supports one or more control operations that relate to the function of output device 80. Web server 82 is configured to support the complete set of printing operations of output device 80, including access, control, and operation of printing in conjunction with printer control software 1220.

In accordance with the present invention, memory 1204 may contain at least one directory which stores at least one interactive application configured for accessing and managing print jobs stored in job retention 1245 (not shown) of output device 80. The at least one interactive application may be stored in memory 1204.

In addition to being linked to a LAN or WAN, output device 80 may be linked directly to the Internet via I/O port(s) 1206 and communication link 68 attached thereto. Local interface(s) 1210 facilitate communication between the internal circuitry and devices of output device 80 as well as communication link 68 via the I/C port 1206. Embedded web server 82 within output device 80 is provided with at least one Uniform Resource Locator (URL), by which it is identified over a network, and which can be accessed via HTTP, for example, from a remotely located workstation over a LAN, WAN, or the Internet. Additional URLs may be provided for components of output device 80 that have differing functions, as depicted by printer web page 84 and document print web content 86.

The output device 80 comprises a web server 82 providing one or more web server functions to requesting users linked by way of one or more of the various networks (LAN, WAN, Internet, etc.). The output device 80 of the present invention may thus be the same as or conceptually similar to the printer apparatus configured with an embedded web server described in U.S. Pat. No. 5,956,487 to Venkatraman et al., assigned to the assignee of the present invention.

Upon retrieval of target data 76, document print web content 86 includes instructions to make use of the retrieved image to display a print dialog box 200 that includes a post-process image 202 (i.e., a print preview image) of the target data 76. It is emphasized that the display of the print dialog box 200 is by operation of the document print web content 86. Furthermore, the print dialog box 200 displays selectable options 204 that are based upon the capabilities of the output device 80. The selectable options 204 that are selected may be graphically represented within the print dialog box 200 and/or the post-process image 202. For instance, if a user selects that the print job should be stapled, a graphical depiction of a staple 216 may appear in the upper right-hand corner of the post-process image 202 of the target data 76. In addition, a graphical depiction of staple selection 206 may appear in the print dialog box 200.

After the user configures and requests printing by selecting print button 210 or other means provided by print dialog box 200, the document print web content 86 causes the client machine 90 to generate a print job. The print job describes the target data 76 and includes the appropriate commands to cause the output device 80 to print the target data 76. The document print web content 86 further causes the client machine 90 to transmit the print job to the output device 80 to be printed. The document print web content 86 downloaded in browser 88 is further configured to transmit appropriate requests to output device 80 in order to determine the print job status. Requests and responses are transmitted on a periodic basis to effectively update the print job status. When a response is received indicating the print job status has changed, the document print web content 86 causes the client machine 90 to display this information.

Although browser 88/extension 94 have been described as processing one set of target data 76 to one output device at a time, multiple print jobs and output devices may be employed. The present invention contemplates that printer web page 84 may be configured to accept and manage multiple target data set requests to multiple output devices. For instance, printer web page 84 may be configured to accept at least one URL address of another desired output device. The user enters the desired output device(s) and selects the get document print service hyperlink 85, and the document print web content 86 is configured to respond to the user request. In one embodiment of the present invention, the document print web content 86 is able to interrogate the desired output devices and graphically represent each output device's selectable options as well as update each print job as it is processed by each output device. Alternatively, multiple browser applications could be executed in separate windows and managed separately by the user as described in the present invention.

In addition, if multiple target data sets are available to a user, drop down menus may be provided to the user as part of the document print web content 86 along with corresponding output device URLs. Therefore, the user could select a target data set from any available target data sets and prescribe a destination URL (and thereby an output device) for that target data set. Thus, the present invention contemplates multiple target data set output. Further, the present invention contemplates multiple output device selection. Even further, the present invention contemplates multiple target data sets in combination with multiple output device selection.

Also, the output device 80 may further distribute the print job. For example, if a user requests twenty copies of a certain target data 76 to be printed, the output device may distribute the print job to multiple output devices to accomplish printing. Five of the original twenty copies of the desired target data 76 may be sent to four appropriate output devices for printing. Thus, a distributed printing environment utilizes output capability in a more efficient manner than typical serial printing in a mainframe printing environment.

Figure 5B:
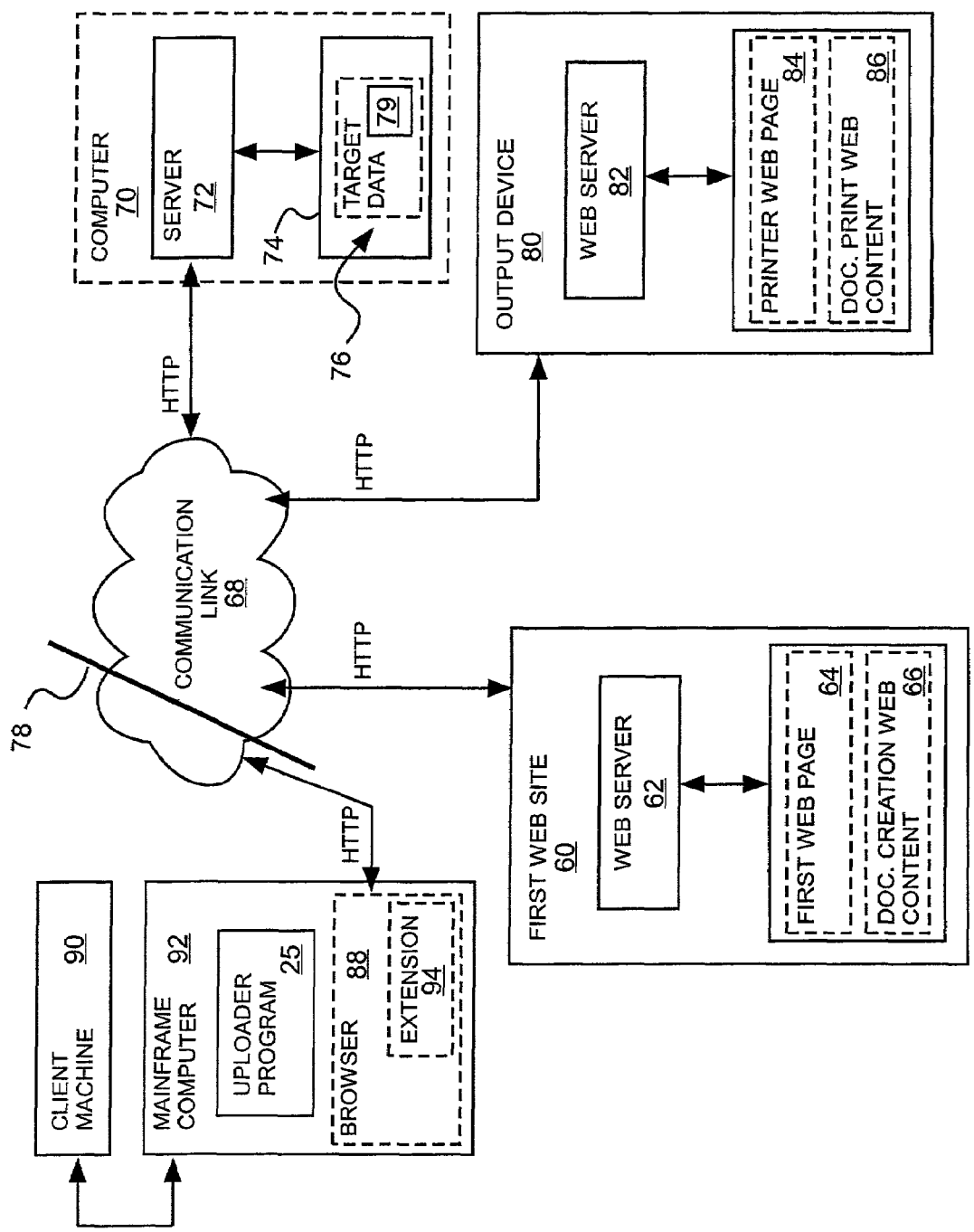
FIG. 5B is a schematic representation of a fifth embodiment incorporating teachings of the present invention.

In a fifth embodiment, shown in drawing FIG. 5B, the distributed imaging environment and devices are similar to the fourth embodiment depicted in drawing FIG. 5A. However, as shown in drawing FIG. 5B, the firewall 78 separates the browser 88 from web server 62, server 72, and web server 82. Therefore, all communications between the browser 88 and other devices must conform to appropriate firewall protocol(s). HTTP is an Internet protocol and is depicted in drawing FIG. 5B for effectuation of communications between browser 88 and other devices. Printing may be effectuated across a firewall 78 via HTTP. As noted earlier, other communication protocols (either now existing or yet to be developed) may be used.

Figure 6A:
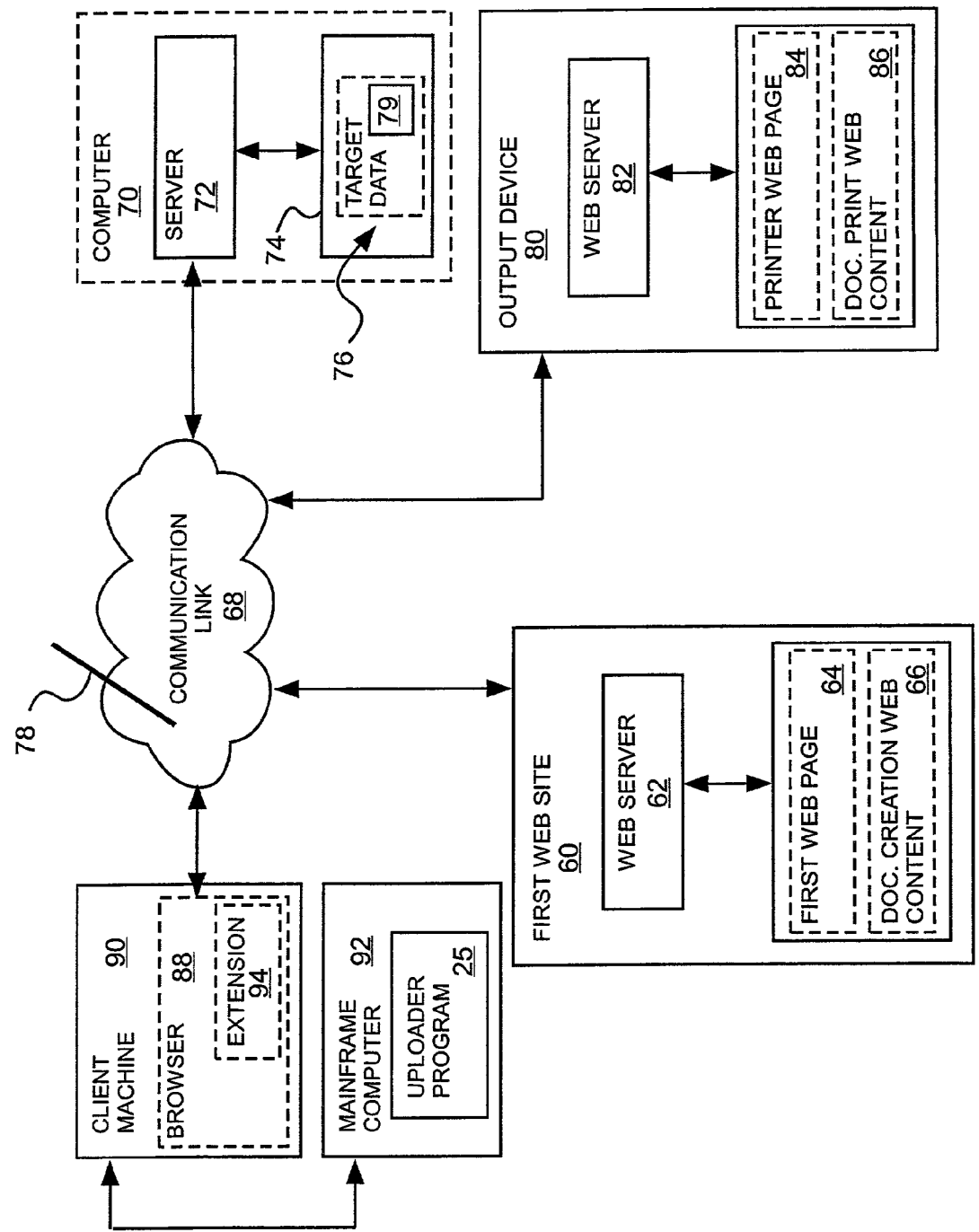
FIG. 6A is a schematic representation of a sixth embodiment incorporating teachings of the present invention.

Illustrated in drawing FIG. 6A is a sixth embodiment, wherein a client machine 90 with limited computing/memory is depicted in a mainframe printing environment. Client machine 90 accesses first web site 60 via communication link 68. Web server 62 responds by transmitting first web page 64 to browser 88.

Figure 8:
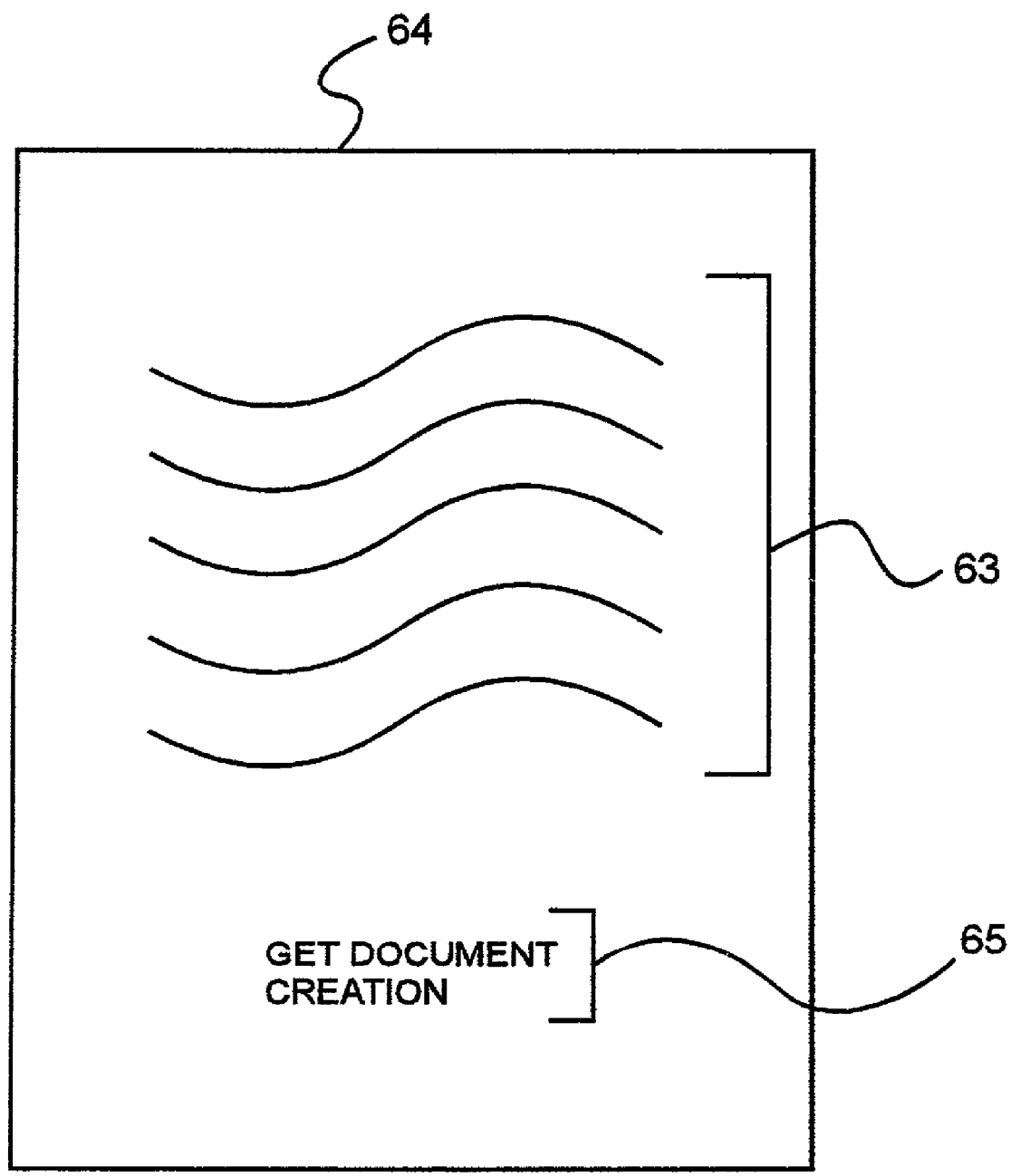
FIG. 8 is a representation of first web page shown in FIGS. 5A-6B.

As shown in drawing FIG. 8, first web page 64 contains a text portion 63 as well as a document creation hyperlink 65 to the document creation web content 66. Upon selection of the document creation hyperlink 65, the document creation web content 66 allows a user to configure an image. The image data describing the image may be formatted in a way that is device independent, such as PDF format, as described hereinbefore.

Turning back to drawing FIG. 6A, the document creation web content 66 also provides a means for a user to save the image as well as the set of data defining the image as target data 76, which is associated with the particular user of the client machine 90. Upon user request to store target data 76, document creation web content 66 generates generic access instructions in order to cause design data 79 generated by the user to define the image as well as the image data to be stored as target data 76. Target data 76 is associated with the user. Association may be accomplished by user login information, or other association means. Extension 94 responds to the generic access instructions generated by the document creation web content 66 and causes the target data 76 to be stored in the storage area 74 of a computer 70. Extension 94 communicates target data 76 over the communication link 68 to computer 70 and may employ firewall 78, if needed, in any suitable firewall protocol. It is important to note that in other embodiments of the invention, other communication protocols (either now existing or yet to be developed) may be used.

Depending on the communication connection configuration of first web site 60, computer 70, and output device 80, communications may be carried out via communication link 68 and possibly firewall 78, if needed. Communications may be accomplished via conventional means, such as I/O ports, network interface cards, or other communication devices. Further, communication link 68 may comprise routers, repeaters, hubs, FEPs, cluster controllers, or other communication means known in the art.

Document creation as depicted in drawing FIG. 6A and described hereinabove may be commercialized as a document creation service, available to accessible users. Information and payment means may be included in first web page 64.

Figure 7:
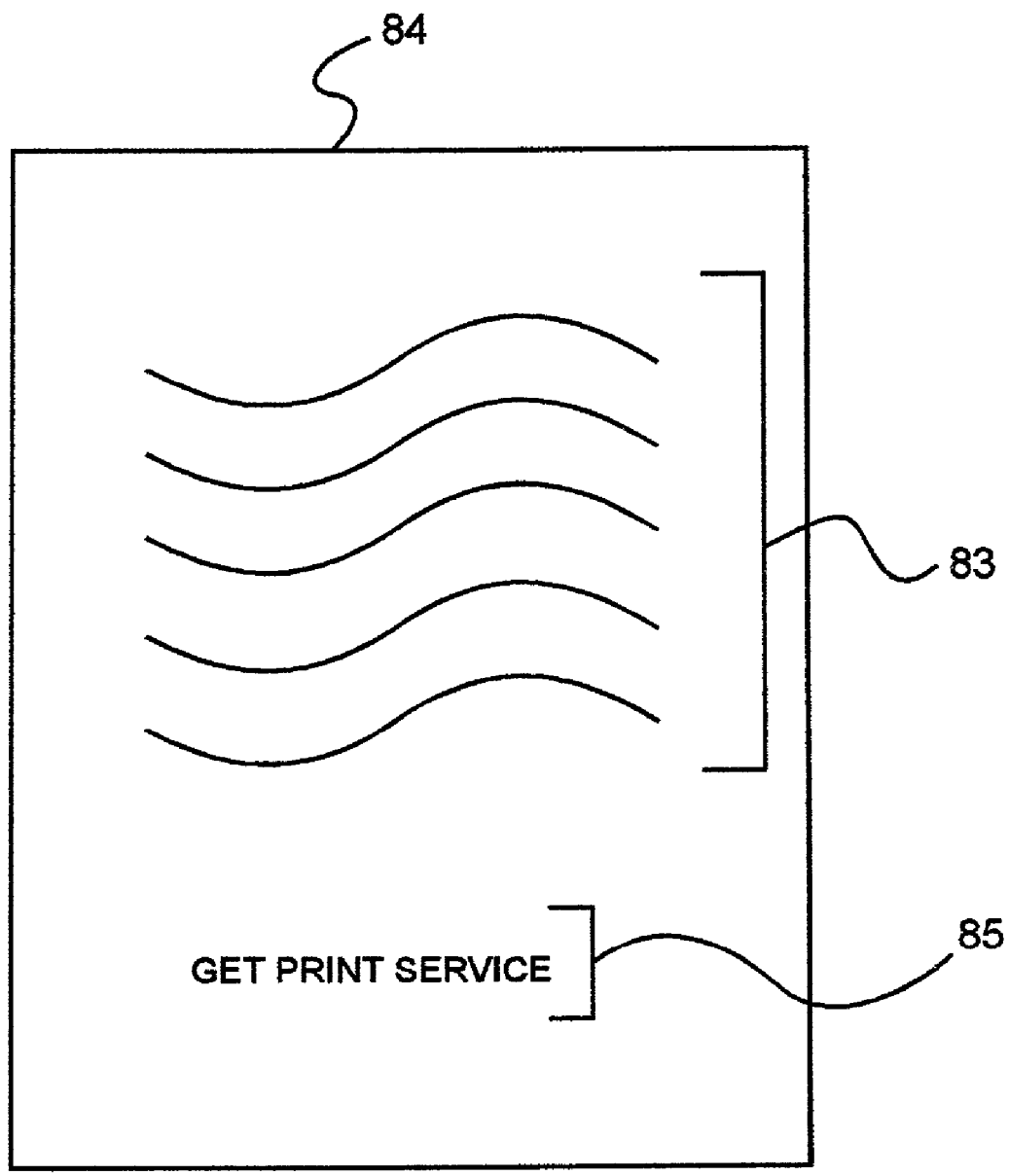
FIG. 7 is a representation of printer web page shown in FIGS. 5A-6B.

After document creation, a user may also generate output from the target data 76. A user of client machine 90 executes browser 88 and inputs the URL of the printer web page 84, thus requesting the printer web page 84. The web server 82 of the output device 80 responds to the request by transmitting the printer web page 84 to the browser 88, which displays the printer web page on the client machine 90. FIG. 7 depicts the printer web page 84 including a text portion 83 as well as a get document print service hyperlink 85. Upon the user selecting the get document print service hyperlink 85, the document print web content 86 is requested by the browser 88 and transmitted by web server 82. Document print web content 86 contains generic access instructions which cause extension 94 to generate generic access requests in order to retrieve target data 76. Generic access requests may contain a file format for the retrieved data. The desired file format may be different from the originally stored file format of target data 76. Thus, the generic access requests communicate the desired file format to server 72 and server 72 provides the target data 76 in the desired format. Accordingly, generic access requests may be tailored depending on the capability of the client machine 90, output device 80, as well as the capability of the communication link 68.

As noted hereinbefore, the browser and/or extension may be tailored depending on the capability of the client machine 90, output device 80, as well as the capability of the communication link 68. Also, browser 88 may be enabled with adaptable extensions or extension functionality that corresponds to the characteristics of the client machine, communication capability, or user preference.

Referring to drawing FIG. 10, output device 80 is configured with an embedded web server 82 for enabling access and interaction with other devices linked to local and external communication networks, including the web, a LAN, a WAN, an intranet, the computer network of an on-line service, etc., and the print engine 1208. Output device 80 is also configured with a microprocessor 1202 which controls all aspects of web server 82, including processing communication protocols and executable programs associated with web server 82 which are stored in ROM (not shown) and/or memory 1204. Memory 1204 may comprise system memory 1211, printer web page 84, document print web content 86, and printer control program 1220.

The print engine 1208 of output device 80 may be provided in any conventional configuration known in the art, including those associated with laser printers, impact printers, photographic printers, and inkjet printers.

In an embodiment, second server 82 uses microprocessor 1202 and the ROM-stored protocols to exchange data with other devices/users on one or more of the networks via HTTP and SMTP, although other protocols such as FTP, SNMP, and Gopher document protocol may also be supported. Web server 82 is further configured to send and receive HTML-formatted files.

Microprocessor 1202 is configured to perform some or all of the printer-specific functions of output device 80, including control of printer-specific hardware and software and print engine 1208. Microprocessor 1202 is provided with memory 1204 in the form of RAM, and/or ROM, and/or hard disk memory. As used herein, the portion of memory 1204 designated for temporarily or permanently storing one or more print jobs or other data storage device in output device 80 is referred to as job retention 1245 (not shown). In one embodiment, a percentage of memory 1204 in output device 80 may be dedicated to web server 82.

Output device 80 may also contain executable software programs stored on memory 1204 related to the operation of web server 82. Memory 1204 may also contain printer-specific software programs relating to the operation of print engine and/or printer-specific hardware. Alternatively, a separate memory capability (not shown) may optionally be provided with the requisite software programs for printing.

Using microprocessor 1202, printer control software 1220, and internal circuitry of output device 80, web server 82 supports one or more control operations that relate to the function of output device 80. Web server 82 is configured to support the complete set of printing operations of output device 80, including access, control, and operation of printing in conjunction with printer control software 1220.

In accordance with the present invention, memory 1204 may contain at least one directory which stores at least one interactive application configured for accessing and managing print jobs stored in job retention 1245 (not shown) of output device 80. The at least one interactive application may be stored in memory 1204.

In addition to being linked to a LAN or WAN, output device 80 may be linked directly to the Internet via I/O port 1206 and communication link 68 attached thereto. Embedded web server 82 within output device 80 is provided with at least one URL, by which it is identified over a network, and which can be accessed via HTTP, for example, from a remotely located workstation over a LAN, WAN, or the Internet. Additional URLs may be provided for components of output device 80 that have differing functions. Such functions may be communicated to a user by way of printer web page 84 and document print web content 86.

The output device 80 comprises a web server 82 providing one or more web server functions to requesting users linked by way of one or more of the various networks (LAN, WAN, Internet, etc.). The output device of the present invention may thus be the same as or conceptually similar to the printer apparatus configured with an embedded web server described in U.S. Pat. No. 5,956,487 to Venkatraman et al., assigned to the assignee of the present invention.

Referring to FIG. 12, upon retrieval of target data 76, document print web content 86 includes instructions to make use of the retrieved image to display a print dialog box 200 (See FIG. 12.) that includes a post-process image 202 (i.e., a print preview image) of the target data 76. It is emphasized that the display of the print dialog box 200 is by operation of the document print web content 86. Furthermore, the print dialog box 200 displays selectable options 204 that are based upon the capabilities of the output device 80. The selectable options 204 may be graphically represented within the print dialog box 200 and/or the post-process image 202 to depict the selected options. For instance, if a user selects that the print job should be stapled in the print dialog box 200, a graphical depiction of a staple 216 appears in the upper right-hand corner of the post-process image 202 of the target data 76.

Still referring to FIG. 12, after the user configures and requests printing via print button 210 or other means available by way of print dialog box 200, the document print web content 86 causes the client machine 90 to generate a print job. The print job describes the target data 76 and includes the appropriate commands to cause the output device 80 to print the target data 76. The document print web content 86 further causes the client machine 90 to transmit the print job to the output device 80 to be printed. The document print web content 86 downloaded in browser 88 is further configured to transmit appropriate requests to output device 80 in order to determine the print job status. Requests and responses are transmitted on a periodic basis to effectively update the print job status. When a response is received indicating the print job status has changed, the document print web content 86 causes the client machine 90 to display this information.

As previously described, a document print service, as depicted in drawing FIG. 6A and described hereinabove by selecting the get print service hyperlink 85, may be commercialized as a service and available to accessible users. Information and payment means may be included in print web page 84.

Figure 6B:
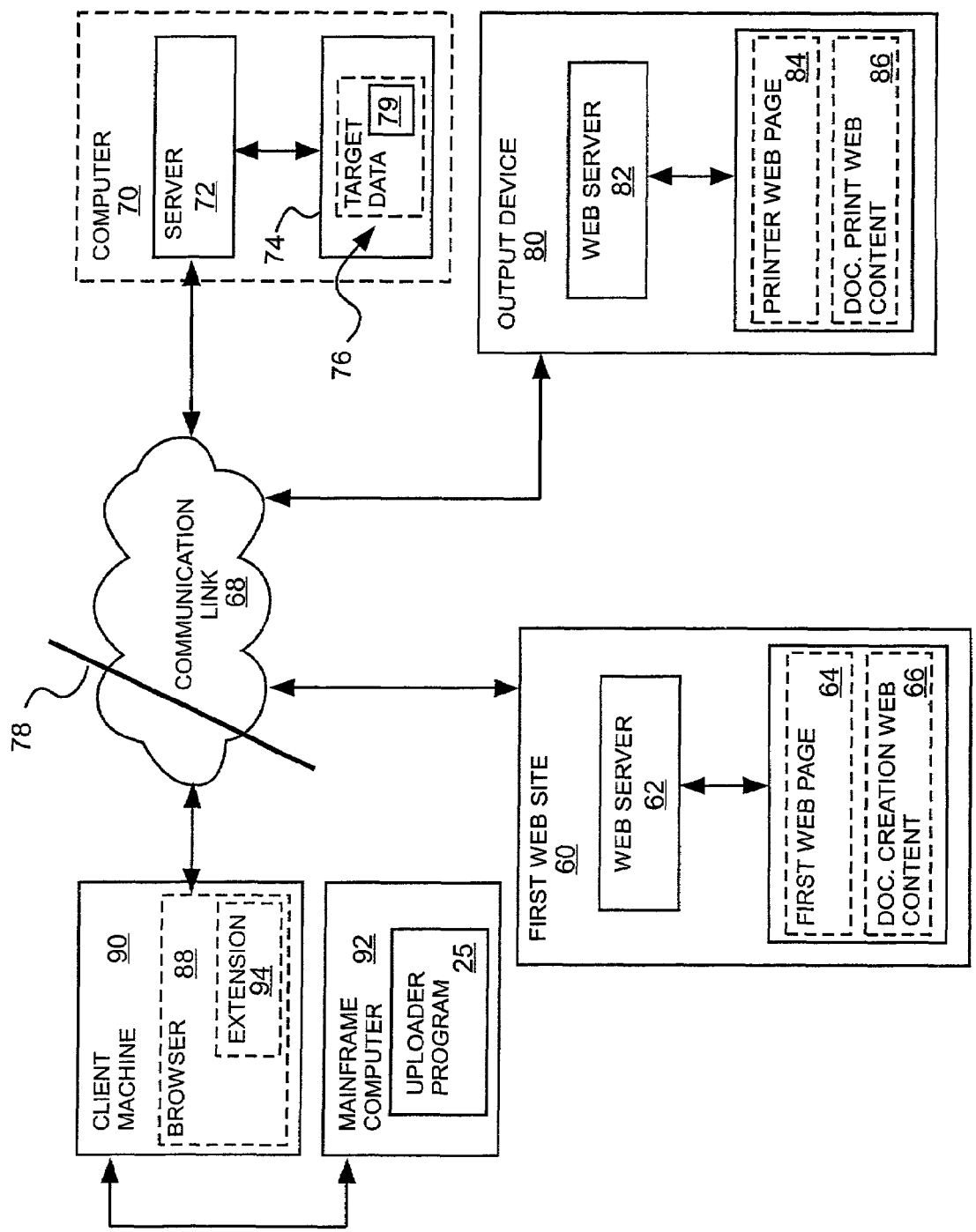
FIG. 6B is a schematic representation of a seventh embodiment, incorporating teachings of the present invention.

Illustrated in drawing FIG. 6B is a seventh embodiment where the distributed imaging environment is similar to the embodiment depicted in drawing FIG. 6A. However, as shown in FIG. 6B, the firewall 78 separates the browser 88 from web server 62, server 72, and web server 82. Therefore, all communications between the browser 88 and other devices must conform to appropriate firewall protocol(s). HTTP is the current Internet standard protocol and is depicted in FIG. 6B for effectuation of all communications between browser 88 and all other connected devices. Printing may be effectuated across a firewall 78. As noted earlier, communication protocols (either now existing or yet to be developed) may be used.

Although the foregoing description contains many specifics, these should not be construed as limiting the scope of the present invention, but merely as providing illustrations of some possible embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A method for accessing data comprising:
   prior to printing of data being initiated,
   configuring the data at least partially obtained from a mainframe system;
   after said data is configured, storing said data;
   after said data is configured and stored, sending at least one generic access instruction from a first server to said mainframe system;
   after the at least one generic access instruction has been sent, identifying said data to be accessed in response to the at least one generic access instruction;
   after said data to be accessed has been identified, supplying from a printing apparatus having an embedded web server, a different at least one generic access instruction operable for providing a print dialog box with selectable options for printing said data with the printing apparatus, such that said data is printed with the printing apparatus after said data has been configured and stored, after the at least one generic access instruction has been sent and the different at least one generic accessed instruction has been supplied, and after said data to be access has been identified; wherein said configuring is at least partially accomplished by an uploader; and wherein said configuring includes said uploader interacting with said mainframe system.

2. The method of claim 1, further comprising:
receiving said at least one generic access instruction; and
accessing at least said data.

3. The method of claim 1, wherein said interacting comprises interacting with an application executed by said mainframe system.

4. The method of claim 1, wherein said interacting comprises interacting with a printing system of said mainframe system.

5. The method of claim 1, further comprising:
generating at least one generic access request via said at least one generic access instruction.

6. The method of claim 1, wherein said identifying comprises associating said data with a computer user.

7. The method of claim 1, wherein said identifying comprises utilizing server side technology.

8. The method of claim 1, wherein said identifying comprises utilizing client side technology.

9. The method of claim 1, wherein said storing comprises storing at least a portion of said data in an independent image format.

10. A method for outputting data comprising:
providing a client having capability to execute a web browser;
providing an extension;
prior to printing of data being initiated,
    configuring the data at least partially obtained from a mainframe system;
    after configuring said data, identifying said data to be accessed in response to at least one generic access instruction;
    after said data to be accessed has been identified, communicating a first web content to said client machine containing at least one generic access instruction causing said data to be accessed;
after the first web content containing the at least one generic access instruction has been communicated, communicating a second web content from a printer incorporating a web server to said client providing capability for outputting said data, the capability for outputting said data comprising a print dialog box including at least one selectable option;
outputting said data, wherein said data is output by the printer after said data has been configured, after the first web content containing the at least one generic access instruction and the second web content have been communicated, and after said data to be accessed has been identified; wherein said configuring is at least partially accomplished by an uploader; and wherein said configuring includes said uploader interacting with said mainframe system.

11. The method of claim 10, wherein said identifying comprises associating said data with a computer user.

12. The method of claim 10, wherein said identifying comprises utilizing client side technology.

13. The method of claim 10, wherein said identifying comprises utilizing server side technology.

14. The method of claim 10, further comprising tailoring said extension to characteristics of said client machine.

15. The method of claim 10, wherein said outputting at least a portion of said data includes outputting additional data.

16. The method of claim 10, wherein said outputting said data includes outputting to multiple devices.

17. The method of claim 10, wherein said at least one generic access instruction causing said data to be accessed causes additional data to be accessed.

18. The method of claim 10, wherein at least a portion of said communicating said first web content utilizes a firewall.

19. The system of claim 18, wherein said at least one generic access instruction is communicated by way of the Internet.

20. The system of claim 18, wherein said at least one generic access instruction is communicated in hyper text transfer protocol.

21. The system of claim 18, wherein said at least one generic access instruction is communicated by way of a firewall.

22. The method of claim 10, wherein at least a portion of said communicating said first web content utilizes the Internet.

23. The method of claim 10, further comprising storing at least a portion of said data in an independent image format.

24. A system for accessing data comprising:
data at least partially obtained from a mainframe system, said data being stored after having been configured, said data being configured and stored prior to printing of said data being initiated;
at least one generic access instruction;
an extension configured to respond to said at least one generic access instruction prior to printing of data being initiated;
a server configured to communicate at least one of said at least one generic access instruction, the extension configured after said at least one generic access instruction has been sent and prior to printing of data being initiated;
a printer with an embedded web server, the printer to print said data;
at least one of the at least one generic access instruction configured to generate a print dialog box including a print preview option for the data,
wherein said data is printed with the printer after said data has been configured and stored, and after said at least one generic access instruction has been sent and has been configured to generate the print dialog box; wherein said data is at least partially obtained by way of an uploader; and wherein said uploader at least partially obtains said data from said mainframe system.

25. The system of claim 24, wherein said at least one generic access instruction causes said extension to access said data.

26. The system of claim 24, wherein said data represents an image in an independent format.

27. The system of claim 24, wherein said uploader at least partially obtains said data from a mainframe printing system.

28. The system of claim 24, wherein said uploader at least partially obtains said data from an application executed by said mainframe system.

29. The system of claim 24, wherein said at least one generic access instruction causes at least one generic access request.

30. The system of claim 24, wherein said at least one generic access request is communicated by way of the Internet.

31. The system of claim 24, wherein said at least one generic access request is communicated by way of a firewall.

32. A system for sharing data comprising:
a client;
data at least partially obtained from a mainframe system, said data being stored after having been configured, said data being configured and stored prior to printing of said data being initiated;
a first server configured to provide at least one generic access instruction after said data has been stored and configured and prior to print of said data being initiated;
an extension configured to respond to at least one generic access instruction after the first server has provided the at least one generic access instruction and configured to communicate with web content containing at least one other generic access instruction configured for causing display of a print dialog box with a plurality of selectable options;
a second server comprising a printing device including a web server and operable for communicating the web content, the printing device to print said data after said data has been configured and stored, and after the at least one generic access instruction has been provided and the at least one other access instruction has been communicated and configured; wherein said data is at least partially obtained by way of an uploader; and wherein said uploader at least partially obtains said data from said mainframe system.

33. The system of claim 32, wherein said at least one generic access instruction of said web contact causes said extension to access said data.

34. The system of claim 32, wherein said data represents an image in an independent format.

35. The system of claim 32, wherein said extension causes said data to be output by way of said output device.

36. The system of claim 35, wherein said data is output by way of the Internet.

37. The system of claim 35, wherein said data is output by way of a firewall.

38. The system of claim 32, wherein said client is configured to execute a browser.

39. The system of claim 32, wherein said extension is tailored to characteristics of said client.

40. The system of claim 32, wherein said data is associated with a user of said client.

41. The system of claim 40, wherein said data is associated with said user by way of client side technology.

42. The system of claim 40, wherein said data is associated with said user by way of server side technology.

* * * * *

UNITED STATES PATENT AND TRADEMARK OFFICE
CERTIFICATE OF CORRECTION

PATENT NO.         : 7,426,549 B2                                              Page 1 of 1
APPLICATION NO.    : 10/159199
DATED              : September 16, 2008
INVENTOR(S)        : Shell S. Simpson et al.

It is certified that error appears in the above-identified patent and that said Letters Patent is hereby corrected as shown below:

In column 25, line 5, in Claim 1, delete "accessed" and insert -- access --, therefor.

In column 25, line 6, in Claim 1, delete "access" and insert -- accessed --, therefor.

Signed and Sealed this

Twelfth Day of May, 2009

JOHN DOLL
*Acting Director of the United States Patent and Trademark Office*